(12) United States Patent
Wheeler

(10) Patent No.: US 9,035,878 B1
(45) Date of Patent: May 19, 2015

(54) INPUT SYSTEM

(75) Inventor: Aaron Joseph Wheeler, San Francisco, CA (US)

(73) Assignee: Google Inc., Mountain View, CA (US)

( * ) Notice: Subject to any disclaimer, the term of this patent is extended or adjusted under 35 U.S.C. 154(b) by 174 days.

(21) Appl. No.: 13/408,905

(22) Filed: Feb. 29, 2012

(51) Int. Cl.
*G09G 5/00* (2006.01)
*G06F 3/033* (2013.01)
*G09G 5/08* (2006.01)
*G06F 3/0484* (2013.01)

(52) U.S. Cl.
CPC .................................. *G06F 3/0484* (2013.01)

(58) Field of Classification Search
CPC ............... G06F 3/011–3/013; G06F 3/04842; G02B 7/002; G02B 27/01; G02B 27/017; G02B 2027/01
USPC .......................................... 345/7–9, 156, 157
See application file for complete search history.

(56) References Cited

U.S. PATENT DOCUMENTS

| | | | |
|---|---|---|---|
| 5,742,263 A | 4/1998 | Wang et al. | |
| 6,061,064 A | 5/2000 | Reichlen | |
| 6,084,556 A * | 7/2000 | Zwern | 345/8 |
| 6,127,990 A | 10/2000 | Zwern | |
| 6,198,462 B1 | 3/2001 | Daily et al. | |
| 6,288,704 B1 | 9/2001 | Flack et al. | |
| 6,359,603 B1 | 3/2002 | Zwern | |
| 6,396,497 B1 | 5/2002 | Reichlen | |
| 6,445,364 B2 | 9/2002 | Zwern | |
| 6,577,329 B1 * | 6/2003 | Flickner et al. | 715/774 |
| 6,847,336 B1 | 1/2005 | Lemelson et al. | |
| 7,190,378 B2 | 3/2007 | Sauer et al. | |
| 7,199,934 B2 | 4/2007 | Yamasaki | |
| 7,365,734 B2 | 4/2008 | Fateh et al. | |
| 7,406,661 B2 | 7/2008 | Vaananen | |
| 7,647,175 B2 | 1/2010 | Fateh | |

(Continued)

FOREIGN PATENT DOCUMENTS

| | | |
|---|---|---|
| EP | 2211224 A1 | 7/2010 |
| JP | 8111878 | 4/1996 |

(Continued)

OTHER PUBLICATIONS

Sanders-Reed et al., "Enhanced and Synthetic Vision System (ESVS) Flight Demonstration," SPIE Digital Library, Mar. 19, 2008, pp. 1, 5, 6, and 8, Proc. SPIE 6957, 69570I (2008), doi:10.1117/12.775910, Orlando, FL, USA.

(Continued)

*Primary Examiner* — Ilana Spar
(74) *Attorney, Agent, or Firm* — McDonnell Boehnen Hulbert & Berghoff LLP

(57) ABSTRACT

Methods and systems involving a graphic display in a head mounted display (HMD) are disclosed herein. An exemplary system may be configured to: (1) display a pointer and a graphic object in a graphic display; (2) receive body movement data; (3) use the body movement data as a basis to move the pointer in the graphic display; (4) define an active region in an area of the graphic display, where the graphic object is activated when the pointer is located within the active region; (5) define an expanded active region that encompasses and is larger than the active region; and (6) make the graphic object active in response to the pointer being moved into the active region and keep the graphic object active until the pointer is moved outside of the expanded active region.

21 Claims, 13 Drawing Sheets

(56) References Cited

U.S. PATENT DOCUMENTS

| | | | |
|---|---|---|---|
| RE42,336 E | 5/2011 | Fateh et al. | |
| 7,948,451 B2 | 5/2011 | Gustafsson et al. | |
| 2003/0020707 A1 | 1/2003 | Kangas et al. | |
| 2005/0076303 A1 | 4/2005 | Vaananen | |
| 2005/0206583 A1 | 9/2005 | Lemelson et al. | |
| 2006/0012884 A1 | 1/2006 | Snorteland et al. | |
| 2007/0011609 A1 | 1/2007 | Adjouadi et al. | |
| 2008/0276196 A1 | 11/2008 | Tang | |
| 2009/0231687 A1 | 9/2009 | Yamamoto | |
| 2010/0259471 A1 | 10/2010 | Takano et al. | |
| 2011/0052009 A1 | 3/2011 | Berkovich et al. | |
| 2011/0115883 A1 | 5/2011 | Kellerman et al. | |
| 2011/0213664 A1 | 9/2011 | Osterhout et al. | |
| 2011/0227820 A1 | 9/2011 | Haddick et al. | |
| 2011/0241982 A1 | 10/2011 | Yang et al. | |
| 2012/0005623 A1 | 1/2012 | Ishak et al. | |
| 2012/0054603 A1 | 3/2012 | Demant et al. | |
| 2012/0151397 A1* | 6/2012 | Oberstein et al. | 715/769 |
| 2012/0223884 A1 | 9/2012 | Bi et al. | |
| 2012/0236037 A1 | 9/2012 | Lessing et al. | |
| 2012/0272179 A1* | 10/2012 | Stafford | 715/781 |
| 2013/0091470 A1 | 4/2013 | Sciammarella et al. | |
| 2013/0097539 A1 | 4/2013 | Mansson et al. | |
| 2013/0117689 A1 | 5/2013 | Lessing et al. | |
| 2013/0139082 A1 | 5/2013 | Wheeler | |

FOREIGN PATENT DOCUMENTS

| | | |
|---|---|---|
| KR | 20030024021 | 3/2003 |
| KR | 100751290 | 8/2007 |
| WO | 2010057304 A1 | 5/2010 |
| WO | 2010118292 A1 | 10/2010 |
| WO | 2011097226 A1 | 8/2011 |

OTHER PUBLICATIONS

Hine et al., "VEVI: A Virtual Environment Teleoperations Interface for Planetary Exploration," University of California, Berkely, SAE 25th International Conference on Environmental Systems, Jul. 1995, p. 8-10, San Diego, CA, USA.

Sowizral and Nadeau, "Introduction to Programming with Java 3D," Java 3D Tutorial Notes, 1999, pp. 332, 344, and 352, Palo Alto, CA, USA.

* cited by examiner

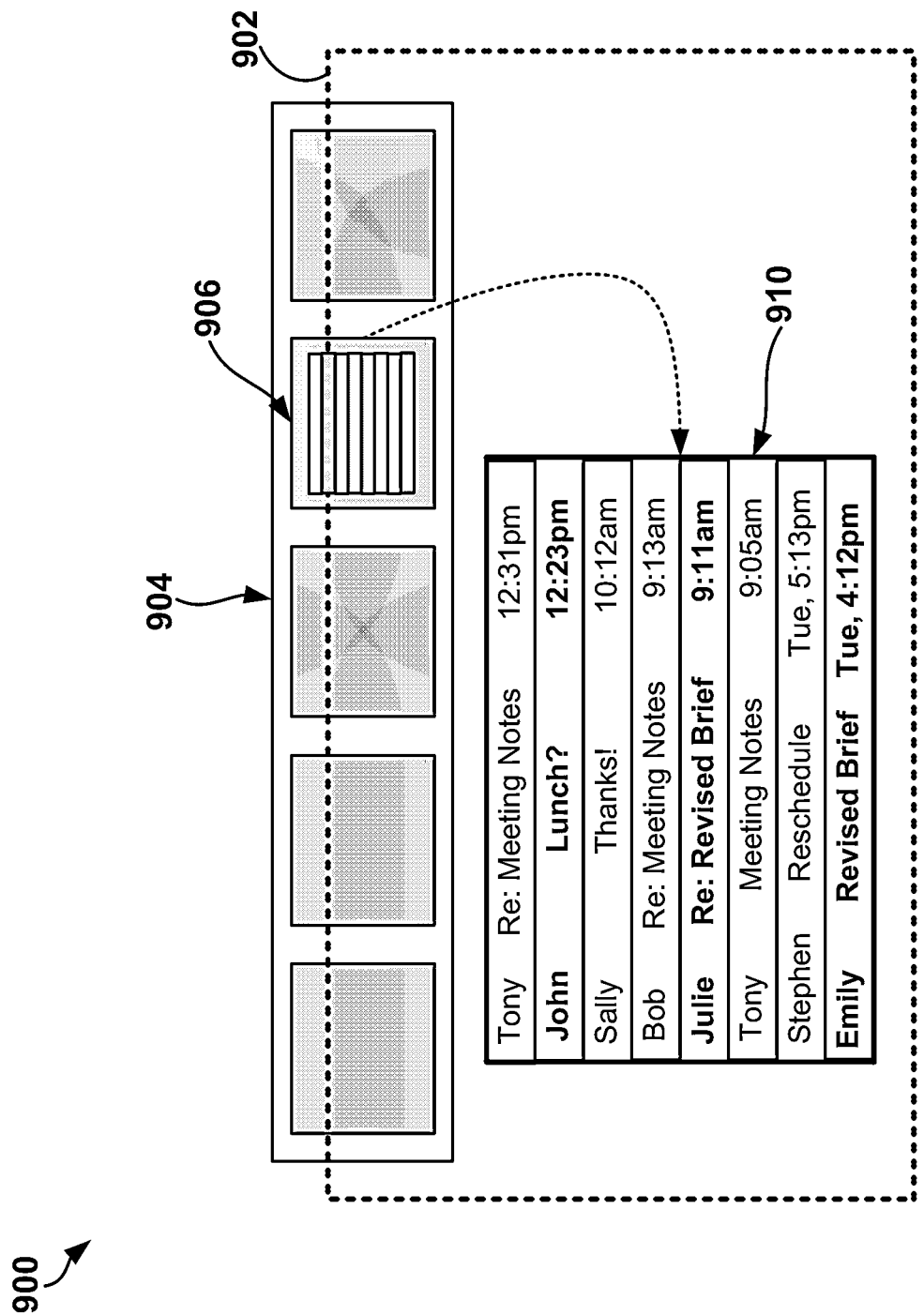

INPUT SYSTEM

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mounted displays" (HMDs). A head-mounted display places a graphic display or displays close to one or both eyes of a wearer. To generate the images on a display, a computer processing system may be used. Such displays may occupy a wearer's entire field of view, or only occupy part of wearer's field of view. Further, head-mounted displays may be as small as a pair of glasses or as large as a helmet.

Emerging and anticipated uses of wearable displays include applications in which users interact in real time with an augmented reality. Augmented reality generally refers to a real-time view of a real-world environment that is augmented with additional content. Typically, a user experiences augmented reality through the use of a computing device. The computing device is typically configured to generate the real-time view of the environment, either by allowing a user to directly view the environment or by allowing the user to indirectly view the environment by generating and displaying a real-time representation of the environment to be viewed by the user.

Further, the computing device is typically configured to generate the additional content. The additional content may include, for example, a user-interface through which the user may interact with the computing device. Typically, the computing device overlays the view of the environment with the user-interface, such that the user sees the view of the environment and the user-interface at the same time.

SUMMARY

In one aspect, a system according to an exemplary embodiment is provided. The system may include a non-transitory computer-readable medium, as well as program instructions stored on the non-transitory computer-readable medium that are executable by at least one processor to: (1) display a pointer in a graphic display, where at least one graphic object is also displayed in the graphic display; (2) receive body-movement data that is indicative of body movement; (3) use the body-movement data as a basis to move the pointer in the graphic display; (4) define an active region in an area of the graphic display that corresponds to the graphic object; (5) define an expanded active region in an area of the graphic display that encompasses and is larger than the active region, and (6) make the graphic object active in response to the pointer being moved into the active region and then keep the graphic object active until the pointer is moved outside of the expanded active region.

In another aspect, a computer-implemented method is provided, according to an exemplary embodiment. The computer-implemented method includes: (1) displaying a pointer and at least one graphic object in a graphic display of a head-mounted display (HMD), where movement of the pointer in the graphic display is based on the body-movement data; (2) determining that the pointer is located within an active region, where the active region includes an area of the graphic display that corresponds to a graphic object; and (3) in response to determining that the pointer is located within the active region: (a) making the graphic object active; and (b) keeping the graphic object active so long as the pointer is within an expanded active region, where the expanded active region comprises an area of the graphic display that encompasses and is larger than the active region.

In another aspect, a non-transitory computer readable medium is provided, according to an exemplary embodiment. The non-transitory computer-readable medium may include program instructions stored on the non-transitory computer-readable medium and executable by at least one processor to perform functions that include: (1) displaying a pointer and at least one graphic object in a graphic display of a head-mounted display (HMD), where movement of the pointer in the graphic display is based on the body-movement data; (2) determining that the pointer is located within an active region, where the active region includes an area of the graphic display that corresponds to a graphic object; and (3) in response to determining that the pointer is located within the active region: (a) making the graphic object active; and (b) keeping the graphic object active so long as the pointer is within an expanded active region, where the expanded active region comprises an area of the graphic display that encompasses and is larger than the active region.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrative embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 9C is a diagram illustrating aspects of an example user-interface after selection of a selected content object, according to an exemplary embodiment.

DETAILED DESCRIPTION

Figure 1:
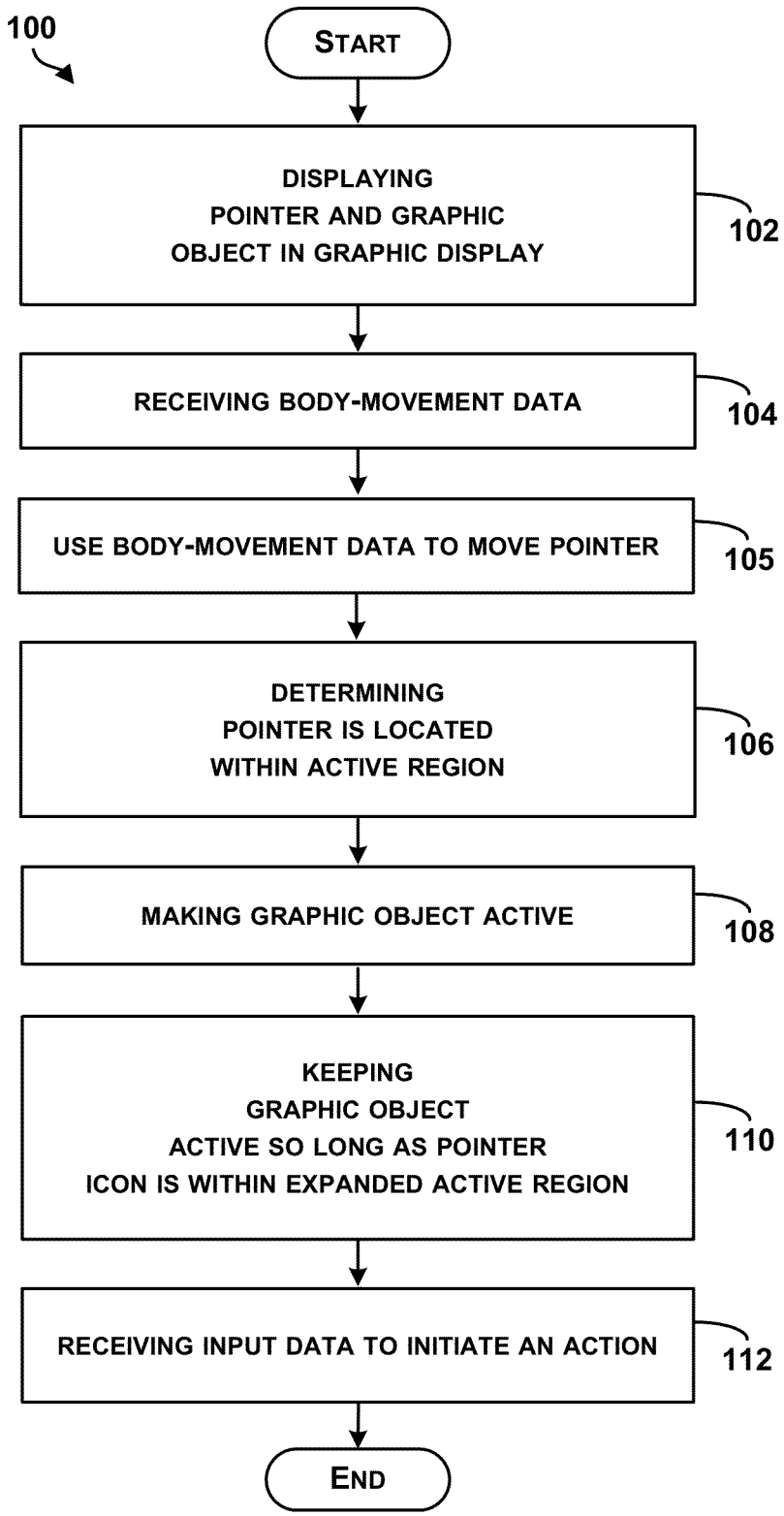
FIG. 1 is a flow chart illustrating a method for interacting with a graphic object, according to an exemplary embodiment.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein. The exemplary embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

A. Overview

A wearable computer may include a graphical display (e.g., such as a head-mounted display (HMD) or heads-up display (HUD)). A wearable-computer may also be configured for eye tracking functionality, such that it can generally track a wearer's eye movements. In addition, a wearable computer may include sensors, such as a gyroscope, an accelerometer, and/or a magnetometer, which may indicate a wearer's head movements. Configured as such, a wearable computer may allow a wearer to provide input data via eye movement and/or via head-movement.

In an exemplary embodiment, a wearable computer may display a moveable pointer (e.g., a selection icon, cursor, arrow, indicator, reticle, or other graphic icon) in the display of its HMD. In some embodiments, the pointer may include a tip, such as a cursor, to provide an indication of its computational point. In addition, in some instances, the pointer may be a reticle providing a given position (e.g., the center) of a display as its computational point.

In addition, the wearable computer may allow a user to control the movement and/or positioning of the pointer based on eye- and/or head-movements. Further, in an exemplary embodiment, the pointer may operate much like a mouse pointer and the graphic object may function similar to a desktop icon on a personal computer. However, such a comparison of aspects of the disclosure herein to other known computing systems is for purposes of example only, and should not be taken to be limiting, as the pointer may take other forms without departing from the scope of the invention.

Further, moving the pointer over a graphic object may put a graphic object in an "active" state (herein, making a graphic object active may interchangeably be referred to as activating the graphic object). When a graphic object is active, the user may initiate an action that is associated with the graphic object (e.g., opening a file or hyperlink that is associated with the graphic object). For instance, a wearer might use eye-movements to move the pointer over a thumbnail image representing a document. Then, while the pointer is over the thumbnail image, the wearer may blink or voice a command (e.g., saying "open") in order to initiate an action associated with the thumbnail image (e.g., opening a document represented by the thumbnail image). Advantageously, allowing eye- and/or head-movement control of a pointer may allow for hands-free use of the wearable computer.

However, using eye- and/or head-movements may create difficulties because a wearer's eyes and head are rarely perfectly still. Typically, a wearer of the HMD experiences a marginal amount of natural jitter (e.g., tremor, muscle contraction, twitching, and/or other involuntary motions.) Natural jitter may inadvertently create eye- and/or head-movement, which in turn may cause the pointer to move away from the graphic object. In some instances, natural jitter may result in making it difficult to activate the graphic object and/or may cause an inadvertent deactivation of the graphic object.

Furthermore, using human interface devices to interact with an activated graphic object might also lead to unintended eye- and/or head-movement. For instance, the act of moving the arm to tap a touchpad, in an attempt to select an activated object, might cause head movement that results in the pointer moving away from the graphic object. When this occurs, the graphic object may be deactivated before the user taps the touchpad, such that the desired interaction with the graphic object does not occur.

Accordingly, exemplary embodiments may help a wearer of an HMD use a pointer to interact with graphic objects on an HMD. In particular, a graphic object may be initially activated when the pointer is moved into an active region, which is typically the area of the display that is occupied by the object. Responsive to making the graphic object active, an expanded active region may encompass the pointer. Therefore, once activated, the graphic object may be kept active so long as the pointer remains within an expanded active region, which includes and extends beyond the area of the display that is occupied by the active region.

B. Exemplary Methods for Activating an Object

FIG. 1 is a flow chart illustrating a method for interacting with a graphic object, according to an exemplary embodiment. In FIG. 1, method 100 is described by way of example as being carried out by a wearable computer, and in particular, by a wearable computer that includes a head-mounted display (HMD). However, it should be understood that exemplary methods, such as method 100, may be carried out by devices other than a wearable computer, and/or may be carried out by sub-systems in a wearable computer or in other devices. For example, an exemplary method may alternatively be carried out by a device such as a mobile phone, which is programmed to simultaneously display a graphic object in a graphic display and also provide a point-of-view video feed in a physical-world window. Other examples are also possible.

As shown by block 102, method 100 involves a wearable computer displaying a pointer and at least one graphic object in a graphic display of an HMD. Further, the wearable computer receives body-movement data that is indicative of body movement, as shown by block 104. The pointer may be moved in the graphic display according to the body movements indicated by the body-movement data, as shown by block 105. At some point, the wearable computer may determine that the pointer is located within an active region that corresponds to the graphic object, as shown by block 106.

Then, in response to determining that the pointer is located within the active region, the wearable computer makes the graphic object active, as shown by block 108. The wearable computer then keeps the graphic object active so long as the pointer is within an expanded active region that is associated with the graphic object, as shown by block 110. In an exemplary embodiment, the expanded active region encompasses and is larger than the active region. Furthermore, while the graphic object is active, the wearable computer may receive input data to initiate an action associated with the graphic object, as shown by block 112.

i. Pointer and Graphic-Object Display

Method 100 further involves the wearable computer displaying a pointer and at least one graphic object in a graphic display of an HMD, as shown by block 102. In some embodiments, displaying a pointer in the graphic display is based on body-movement data.

Figure 2C:
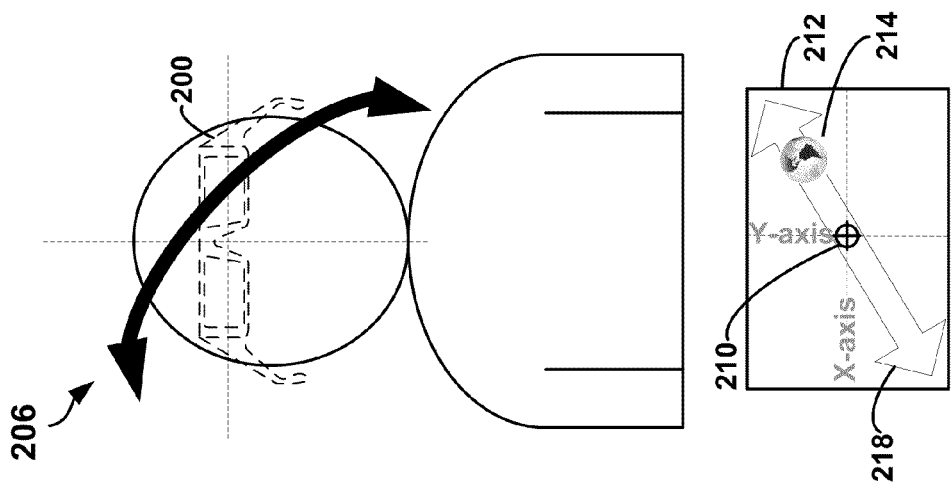
FIGS. 2A, 2B, and 2C are diagrams illustrating body-movement and corresponding pointer movement, according to an exemplary embodiment.
Figure 2B:
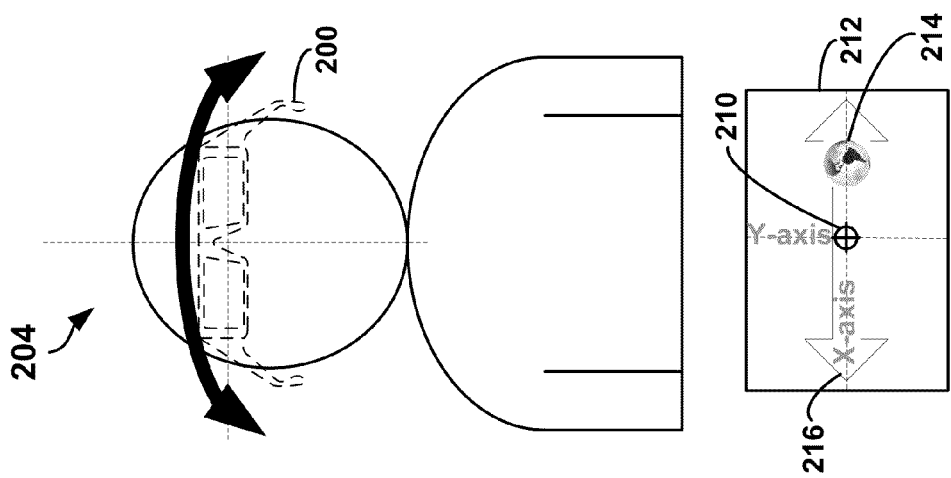
Figure 2A:
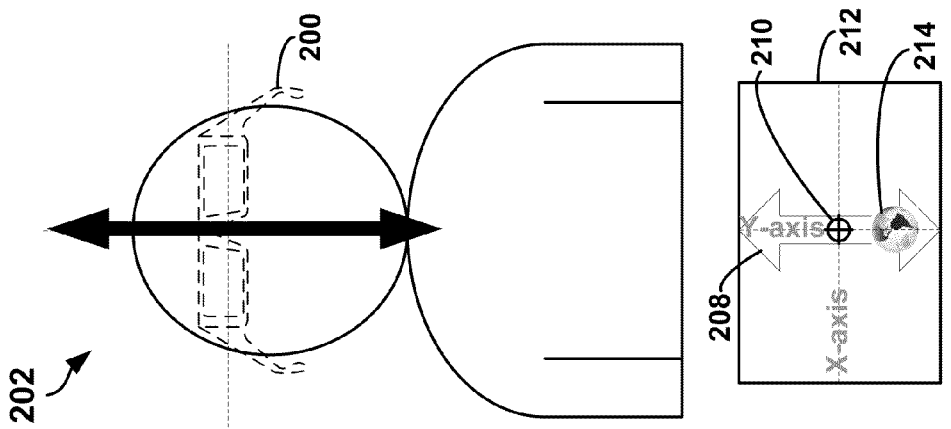

FIGS. 2A, 2B, and 2C are diagrams illustrating body-movement and corresponding pointer movement, according to an exemplary embodiment. In addition, FIGS. 2A, 2B, and 2C illustrate displaying a pointer and a graphic object in a graphic display. For example, FIG. 2A illustrates displaying pointer 210 with graphic object 214 on graphic display 212. In FIG. 2B, pointer 210 is displayed with graphic object 214 on graphic display 212. Further, in FIG. 2C, pointer 210 is displayed with graphic object 214 on graphic display 212.

ii. Receiving Body-Movement Data

As noted, exemplary method 100 involves a wearable computer receiving body-movement data indicative of body movement, as shown by block 104. In some embodiments, sensory configurations may be used with a wearable computer to receive body-movement data that is indicative of body movement (e.g., movements of the head or eyes of a wearer of the wearable computer, hand gestures, arm movements, etc.).

In some embodiments, sensors may be mounted on the wearable computer or provided on other parts of the wearable to include more than one type of sensor device or element. By way of example and without limitation, example sensors could be any one or more of a motion detector (e.g., a gyroscope, an accelerometer, a camera, and/or a shock sensor), an impact sensor, a contact sensor (e.g., capacitive sensing device), a location determination device (e.g., a GPS device), a magnetometer, and an orientation sensor (e.g., a theodolite). Other detection devices or elements may be included within these sensors and other functions may be performed by these sensors to receive body-movement data. Exemplary embodiments of sensors that may be included in an example computing system are discussed further below with respect to FIGS. 5A and 9A.

In some embodiments, a wearable computer may include one or more sensors to receive body-movement data corresponding to a wearer's body movement. In some instances, sensors in a wearable computer may receive body-movement data corresponding to movements of a wearer's head while wearing an HMD For example, in FIG. 2A, wearable computer 200 may include a variety of sensory configurations to receive body-movement data from vertical rotation of the head 202. Similarly, in FIG. 2B, wearable computer 200 may utilize a variety of sensory configurations to receive body-movement data from horizontal rotation of the head 204. Yet further, in FIG. 2C, wearable computer 200 may utilize a variety of sensory configurations to receive body-movement data from diagonal rotation of the head 206. Other movements of the wearable computer are possible and the wearable computer may utilize a variety of sensory configurations to receive such data accordingly.

As noted, exemplary method 100 involves a wearable computer using body-movement data to move a pointer, as shown by block 105. In some embodiments, the body-movement data received from eye- and/or head movement may correspond to pointer movement in a graphic display. In some instances, body-movement data may be based on spherical coordinates in a three-dimensional space corresponding to the wearable computer.

Further, in some instances, such body-movement data may be mathematically converted to Cartesian coordinates in a two-dimensional space, perhaps shown on a graphical display. For example, software algorithms, including 3D computational language and/or numerical computing environments, may be utilized to make such conversions. In some instances, as further described below, one or more software algorithms may be used to create a speed parameter to map a given amount of body movement to an amount of pointer movement.

In some embodiments, the body-movement data received from eye- and/or head movement while wearing an HMD may control the pointer movement in the graphic display. For example, in FIG. 2A, wearable computer 200 may receive data associated with vertical rotation of the head 202 and responsively cause pointer 210 to move on a vertical path 208 along the y-axis shown in graphic display 212. In FIG. 2B, wearable computer 200 may receive data associated with horizontal rotation of the head 204 and responsively cause pointer 210 to move on a horizontal path 216 along the x-axis shown in graphic display 212. Further, in FIG. 2C, wearable computer 200 may receive data associated with diagonal rotation of the head 206 and responsively cause pointer 210 to move on a diagonal path 218 with respect to both the x-axis and y-axis in graphic display 212. It should be understood that many other body movements and corresponding movements of the pointer are also possible.

In some embodiments, the pointer may not provide an indication of its computational point (e.g., may not be visible) and instead, may simply be defined by a position in the graphic display, such as the center of the graphic display.

In some embodiments, the pointer may be fixed in one position of the graphic display (e.g., the center of the graphic display) and the body-movement data may move the entire graphic display throughout a larger navigable area (e.g., content in the graphic display). In addition, in some embodiments, the pointer may not be fixed to any position in the graphic display and may move relative to the bounds of the graphic display. In particular, once the pointer reaches the bounds of the graphic display or near such bounds, the graphic display may adjust its view to show additional portions of the navigable area as indicated and/or directed by the pointer's movement. Other possibilities may also exist.

iii. Determining that a Pointer is Located within an Active Region

Method 100 further involves determining that the pointer is located within an active region that corresponds to the graphic object, as shown by block 106. In an exemplary embodiment, the active region is the area of the graphic display in which the graphic object is displayed. In such an embodiment, the boundary of the active region may accordingly be defined by the edge or outline of the graphic object.

Figure 3A:
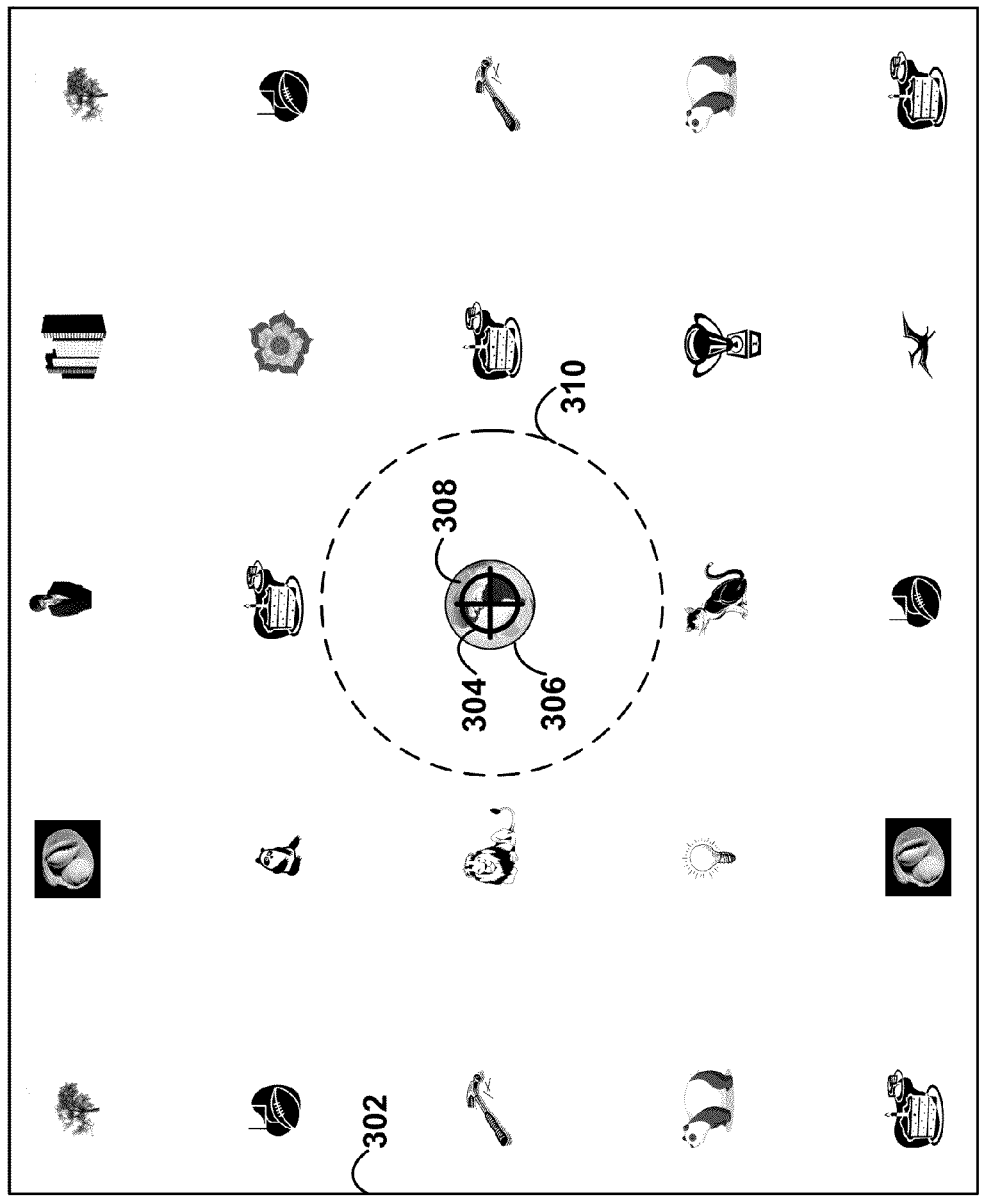
FIG. 3A is a diagram illustrating a pointer in a graphic display, according to an exemplary embodiment.

FIG. 3A is a diagram illustrating a pointer in a graphic display, according to an exemplary embodiment. In particular, FIG. 3A illustrates pointer 304 in graphic display 302, which can be visibly provided to a wearer of an HMD. In addition, also provided to the wearer is graphic object 306 which includes active region 308 defined by the area inside of the outlining border for graphic object 306.

In some embodiments, body-movement data received from eye- and/or head movement while wearing the HMD may cause the pointer to position itself within the active region. For example, in FIG. 3A, a wearer of an HMD may make head movements to move pointer 304 into active region 308.

In some embodiments, the active region may be larger than the defined edge or outline of the graphic object. Further in some instances, a larger active region may be implemented in practice such that it is programmatically distinct from an active region that is defined by the edge or outline of the graphic object. However, in practice, a pointer may enter a larger active region in a similar way as with an active region that is defined by the edge or outline of the graphic object.

In some instances, an active region may be virtually defined but may not be visible to a wearer of the HMD. For example, an active region may be bigger than the defined edge or outline of the graphic object and not visible to a wearer of the HMD. In addition, in some instances, an active region may be smaller than the defined edge or outline of the graphic object and not visible to a wearer of the HMD. Alternatively, as shown in FIG. 3A, active region 308 may be visible to the wearer to further facilitate using eye- and/or head-movements to move pointer 304 into active region 308.

In some embodiments, an active region may adjust its size, shape, and/or color depending on its surroundings. In particular of these embodiments, the active region may make such adjustments to make it easier to position the pointer into the active region. For example, active regions may shrink, expand, or take the form of various shapes based on the amount of free space available on the graphic display. In some instances, an active region may adjust to the amount of free space surrounding the graphic object such that it does not overlap with other active regions respective to other graphic objects.

In some embodiments, an active region may be temporarily visible on the graphic display. For example, a visual representation of the active region may only appear as the pointer approaches the vicinity of an active region respective to the graphic object. Then, after the pointer moves away from the active region without activating the graphic object, the visual representation of the active region may gradually fade away.

Further, in some instances, a representation of the active region may only appear when the pointer crosses the boundary of the active region. Thereafter, the pointer may move away from the active region and the visual representation of the active region may fade away.

iv. Activating a Graphic Object

In response to determining that the pointer is located within the active region, method 100 further involves making the graphic object active, as shown by block 108. In some embodiments, a graphic object becomes active when the pointer enters an active region respective to the graphic object.

In some embodiments, a graphic object may become active (i.e., be activated) when the pointer enters the active region respective to the graphic object and is completely encompassed within the active region. Further, in some embodiments, a pointer may be a collection of points where one or more may have to enter the active region to activate the graphic object or alternatively, exit an expanded active region to deactivate it. For an example, referring back to FIG. 3A, graphic object 306 may become active when pointer 304 fully enters active region 308 such that it is encompassed by the edge or outline of graphic object 306.

More specifically, active region 308 may be defined by a set of (x1 ... xn, y1 ... yn) points in a coordinate system embedded within graphic display 302. Further, pointer 304 may be defined a location (x, y) within graphic display 302 such that its location (x, y) changes corresponding to the body-movement data received. Yet further, when the location (x, y) of pointer 304 matches any of the (x1 ... xn, y1 ... yn) points and/or coordinates that define active region 308, it may be determined when pointer 308 enters active region 308, resulting in making graphic object 306 active.

In some embodiments, a graphic object may become active when the pointer is partially encompassed within the active region. For example, in FIG. 3A, a pointer 304 may also be defined by a set of (x1 ... xn, y1 ... yn) points in a coordinate system embedded within graphic display 302. Further, pointer 304 may be partially encompassed within active region 308, making graphic object 306 active. Other possibilities may also exist.

v. Keeping a Graphic Object Active

Once a graphic object is active, method 100 further involves keeping the graphic object active so long as the pointer is within the expanded active region, as shown by block 110. As noted, natural jitter from body movement and other situations may make it challenging for a wearer of the HMD to keep the pointer over a graphic object (i.e., within the active region of the object), in order to interact with the object. Also as noted, to overcome such challenges, an active region may be larger than the outlining border of the graphic object, making it easier to activate the graphic object. Thus, the expanded active region is typically defined to be larger than the active region and/or encompasses the active region.

In some embodiments, the expanded active region may be a similar shape as the active region. For example, in FIG. 3A, expanded active region 310 is a large circle encompassing and including active region 308, which also takes the form of a circle. However, expanded active regions can take the form of other shapes as well.

After making graphic object 306 active, graphic object 306 may continue to be active so long as pointer 304 is within expanded active region 310. Once pointer 304 moves outside of expanded active region 310, graphic object 306 may be deactivated and pointer 304 may activate other graphic objects. Although, in some embodiments, pointer 304 may activate more than one graphic object. Other possibilities may also exist.

As noted, in some embodiments, a speed parameter may be used to map a given amount of body movement to an amount of pointer movement (such as a first amount of pointer movement.) Further, in some embodiments, the speed parameter may be adjusted so as to map the amount of body movement to a second amount of pointer movement.

In some instances, the second amount of pointer movement is less than the first amount of pointer movement originally mapped to the given amount of body movement. More specifically, the sensitivity of the pointer may be configured in terms of counts per inch (CPI), which includes the number of counts for the pointer to move one inch on the graphic display. To decrease the amount of pointer movement mapped to the given amount of body movement, the CPI may be increased when pointer is in the expanded active region.

For example, in FIG. 3A, pointer 304 may move slower with corresponding body movements within expanded active region 310 as opposed to areas outside of expanded active region 310. In some instances, pointer 304 may move slower to account for any natural jitter that could cause graphic object 306 to be inadvertently deactivated.

In some embodiments, a predetermined exit velocity may be required to move the pointer outside of the expanded active region. In some instances, a predetermined exit velocity may include a specific movement of the wearable computer and/or the HMD, which may result from body movement of the wearer.

For example, referring back to FIG. 2B, data received from horizontal rotation of the head 204 may correspond to pointer 210 moving along the x-axis, away from graphic object 214. In some instances, horizontal rotation of the head 204 while wearing wearable computer 200 may be a specific movement that causes a deactivation of graphic object 214. Other possibilities may also exist.

In some instances, a determined velocity exceeding a predetermined exit velocity may cause the pointer to move outside of the expanded active region. For example, referring back to FIG. 3A, a head movement with a specific velocity may exceed a predetermined exit velocity such that pointer 304 moves outside of expanded active region 310, causing a deactivation of graphic object 306.

Further, in some instances, the velocity of the head movement may be continuously sampled and compared with a threshold or predetermined exit velocity. Once the threshold or predetermined exit velocity is exceeded, pointer 304 may move outside of the expanded active region 310.

In some instances, a predetermined exit acceleration may be required to move pointer 304 outside of the expanded active region 310, resulting in deactivating graphic object 306. Similar to the predetermined exit velocity described above, the acceleration of the head movement may be compared with a predetermined exit acceleration and once predetermined exit acceleration is exceeded, pointer 304 may move outside of expanded active region 310. Other possibilities may also exist.

In some embodiments, expanded active regions may vary in shape. In some embodiments, expanded active regions may be custom-designed for a particular pattern of head movements unique to a wearer of the HMD and/or wearable computer. For example, a particular wearer may make a regular tremor such that the HMD moves continuously in a certain diagonal pattern. In such a case, the expanded active region may be designed and shaped to offset such movements corresponding to the regular tremor.

Further, in some instances, the expanded active region may be virtually defined, but not visible to a wearer of the HMD. Alternatively, the expanded active region may also be visible to the wearer once the respective graphic object is activated. For instance, in FIG. 3A, a visual representation of the expanded active region 310 may be provided on graphic display 302 to further facilitate in keeping pointer 304 within expanded active region 310.

Figure 3B:
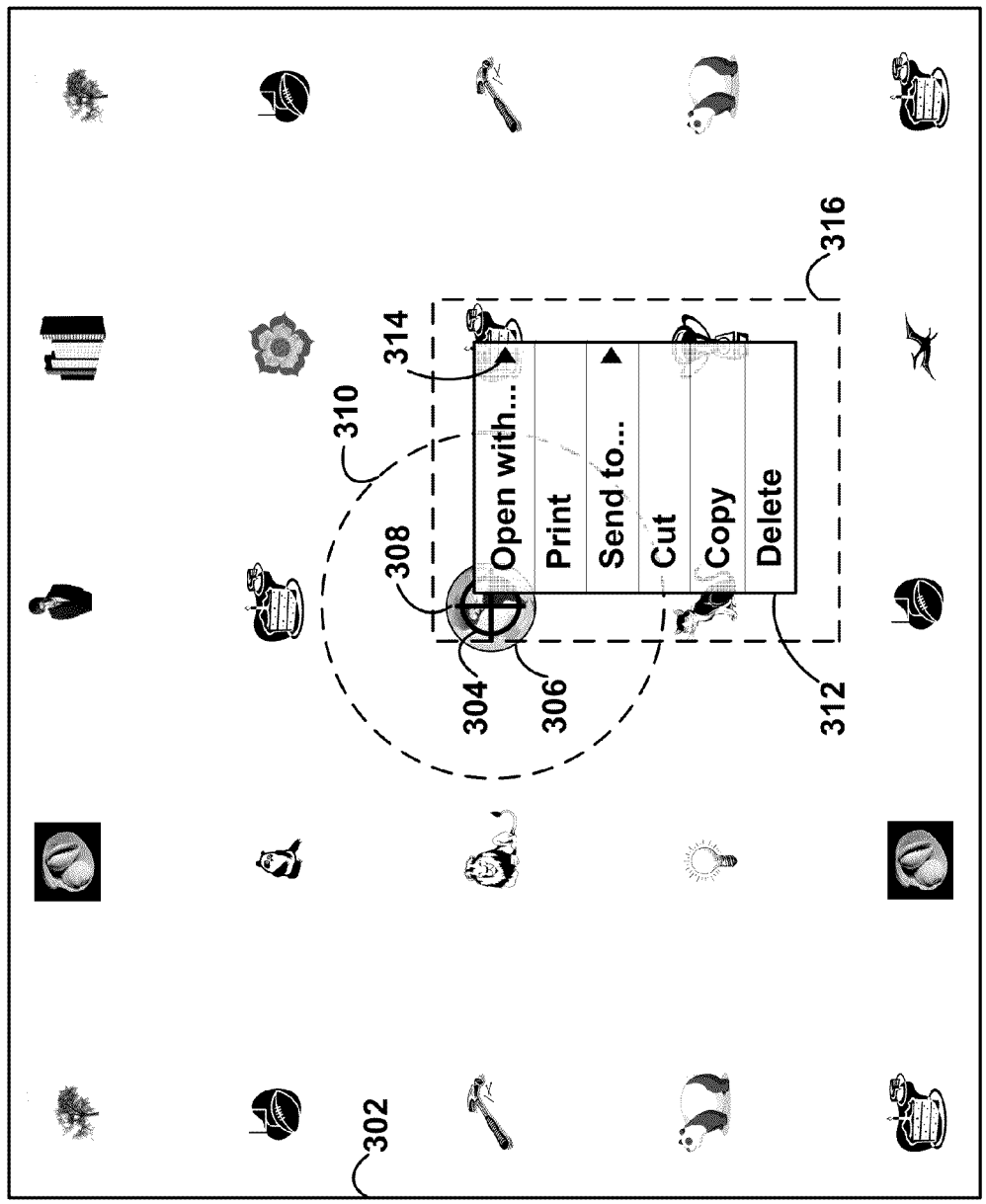
FIG. 3B is a diagram illustrating an interaction with a graphic object, according to an exemplary embodiment.

In some embodiments, an expanded active region may be modified. For example, an expanded active region may change based on interacting with the graphic object. FIG. 3B illustrates activating a graphic object, according to an exemplary embodiment. In particular, FIG. 3B illustrates pointer 304 which activates graphic object 306. (FIG. 3B may include the same or similar graphic display 302, pointer 304, graphic object 306, active region 308, and expanded active region 310 as shown in FIG. 3B.)

After activating graphic object 306, other actions may be initiated such that option menu 312 may appear, transforming expanded active region 310 to also include expanded active region 316. After transforming expanded active region 310 to also include expanded active region 316, graphic object 306 may continue to be active so long as pointer 304 is within expanded active region 310 and expanded active region 316. Once pointer 304 moves outside of expanded active region 310 and expanded active region 316, graphic object 306 may be deactivated and pointer 304 may activate other graphic objects.

v. Initiating an Action

An exemplary method may further involve receiving input data while a graphic object is active, which corresponds to an action that is associated with the graphic object, as shown by block 112.

Receiving input data may involve, but is not limited to, receiving eye- and/or head-movement data from a head-mounted display (HMD) associated with a wearable computer, receiving vocal signals provided by a wearer of the HMD, and/or receiving input data from touchpad and/or keypad associated with the wearable computer. Other types of input data are also possible.

In an exemplary embodiment, body movements may include a first head movement that may be used to position the pointer in the active region of a graphic object, thus activating the graphic object. Once the object is active, body movements including a second head movement, which is typically different than the first head movement, may be used to initiate an action.

Various types of actions may be initiated while a graphic object is active. For example, such actions may include selecting the graphic object, opening a file associated with the graphic object, displaying information associated with the graphic object, zooming in on the graphic object, viewing information regarding relationships between the graphic object and other graphic objects, and/or providing an option menu to specify an action associated with the graphic object. Other actions are also possible.

In some embodiments, an action may be initiated when the pointer enters the active region and remains in the active region for a period of time exceeding a predetermined period of time. In some cases, determining that the pointer has been active for a threshold period of time may responsively trigger selecting the graphic object. For example, in FIG. 3B, a counter may be used to compute the number of units in time (e.g., milliseconds, seconds, etc.) pointer 304 is within active region 308. Once the number of units meet or exceed a threshold period of time, graphic object 306 may be selected.

In some instances, upon selecting graphic object 306, option menu 312 may appear. Pointer 304 may then move onto option menu 312 and position on arrow 314 to view other option menus for opening graphic object 306. In addition, further actions may be initiated such as printing graphic object 306, sending graphic object 306 to another location, cutting graphic object 306, copying graphic object 306, and/or deleting graphic object 306. Other actions are also possible.

In some embodiments, an action may be initiated once the pointer enters the active region and moves at a rate of movement less than a predetermined rate of movement. For example, in FIG. 3B, a rate of movement for pointer 304 may be determined after pointer 304 enters active region 308.

In some embodiments, the rate of movement may be determined by measuring the distance traveled by pointer 304 (e.g., pixels, inches, etc.) over a given period of time (e.g., milliseconds, seconds, etc.) Further, this rate of movement may be monitored and/or compared with a predetermined threshold rate of movement for selecting graphic object 306. Once this rate of movement drops below the predetermined rate of movement, graphic object 306 may be selected, perhaps causing option menu 312 to appear.

C. Exemplary Transparent Display

Figure 4:
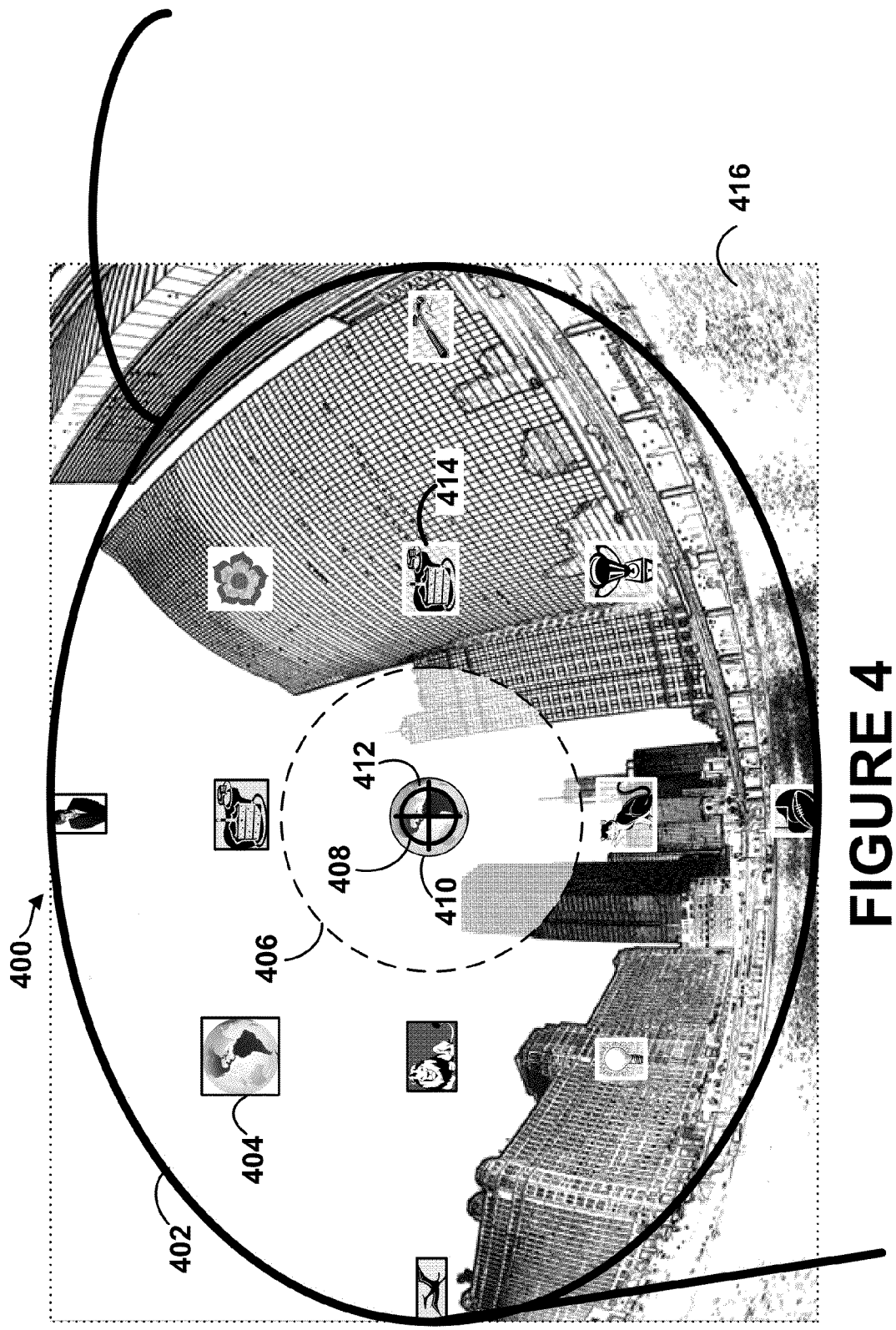
FIG. 4 is a diagram illustrating a substantially transparent display, according to an exemplary embodiment.

FIG. 4 is a diagram illustrating a substantially transparent display, according to an exemplary embodiment. In FIG. 4, an example system 400 is shown in the form of a wearable computing device. Graphic display 402 is provided through the left frame of the wearable computing device and is substantially transparent to provide a view of the physical world 416. Furthermore, graphic display 402 includes graphic objects 404, 410, and 414. Pointer 410 is shown within active region 412 and expanded active region 406, possibly selecting graphic object 410. Further, active region 412 and expanded active region 406 are shown with a semi-transparent background, providing a visual representation of the regions. However, in some instances active region 412 and expanded active region 406 may be provided virtually but without a visual representation to the wearer of the wearable computing device. As illustrated, graphic objects 404, 410, and 414 are shown in graphic display 402 by adapting to the background of physical world 416. For example, graphic object 404 is shown with a dark background to illustrate its contrast with a lighter area of physical world 416. In addition, graphic object 414 is shown with a light background to also illustrate its contrast with a darker area of physical world 416. Both graphic object 414 and 416 are shown to adapt to physical world 416 and to improve the wearer's ability to see the graphic objects within the graphic display 402.

D. Example System and Device Architecture

Figure 5A:
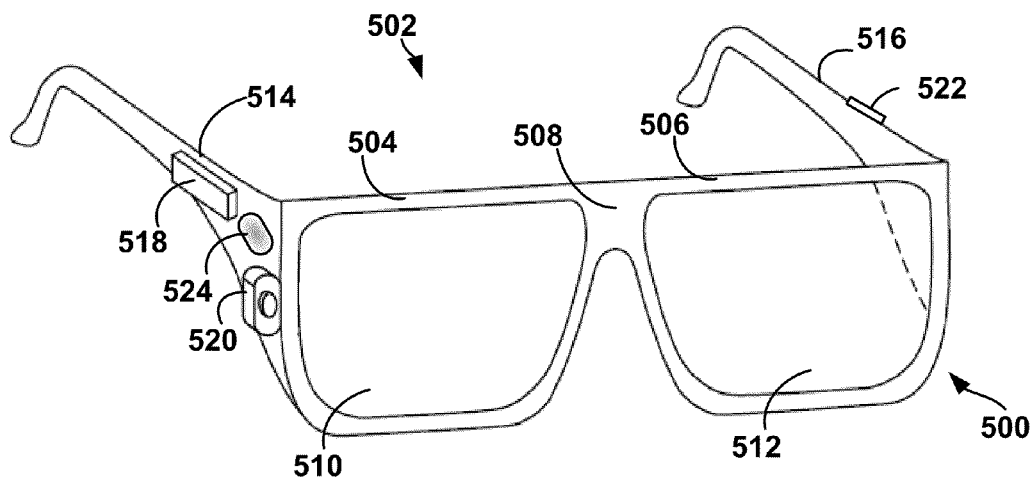
FIG. 5A is a diagram illustrating a first example system for receiving, transmitting, and displaying data, according to an exemplary embodiment.

FIG. 5A is a diagram illustrating a first example system for receiving, transmitting, and displaying data, according to an exemplary embodiment. The system 500 is shown in the form of a wearable computing device. While FIG. 5A illustrates a head-mounted device 502 as an example of a wearable computing device, other types of wearable computing devices could additionally or alternatively be used. As illustrated in FIG. 5A, the head-mounted device 502 has frame elements including lens-frames 504, 506 and a center frame support 508, lens elements 510, 512, and extending side-arms 514, 516. The center frame support 508 and the extending side-arms 514, 516 are configured to secure the head-mounted device 502 to a user's face via a user's nose and ears, respectively.

Each of the frame elements 504, 506, and 508 and the extending side-arms 514, 516 may be formed of a solid structure of plastic and/or metal, or may be formed of a hollow structure of similar material so as to allow wiring and component interconnects to be internally routed through the head-mounted device 502. Other materials may be possible as well.

One or more of each of the lens elements 510, 512 may be formed of any material that can suitably display a projected image or graphic. Each of the lens elements 510, 512 may also be sufficiently transparent to allow a user to see through the lens element. Combining these two features of the lens elements may facilitate an augmented reality or heads-up display where the projected image or graphic is superimposed over a real-world view as perceived by the user through the lens elements 510, 512.

The extending side-arms 514, 516 may each be projections that extend away from the lens-frames 504, 506, respectively, and may be positioned behind a user's ears to secure the head-mounted device 502 to the user. The extending side-arms 514, 516 may further secure the head-mounted device 502 to the user by extending around a rear portion of the user's head. Additionally or alternatively, for example, the system 500 may connect to or be affixed within a head-mounted helmet structure. Other possibilities exist as well.

The system 500 may also include an on-board computing system 518, a video camera 520, a sensor 522, and a finger-operable touch pad 524. The on-board computing system 518 is shown to be positioned on the extending side-arm 514 of the head-mounted device 502; however, the on-board computing system 518 may be provided on other parts of the head-mounted device 502 or may be positioned remote from the head-mounted device 502 (e.g., the on-board computing system 518 could be connected by wires or wirelessly connected to the head-mounted device 502). The on-board computing system 518 may include a processor and memory, for example. The on-board computing system 518 may be configured to receive and analyze data from the video camera 520, the sensor 522, and the finger-operable touch pad 524 (and possibly from other sensory devices, user-interfaces, or both) and generate images for output by the lens elements 510 and 512. The on-board computing system 518 may additionally include a speaker or a microphone for user input (not shown). An example computing system is further described below in connection with FIG. 8.

The video camera 520 is shown positioned on the extending side-arm 514 of the head-mounted device 502; however, the video camera 520 may be provided on other parts of the head-mounted device 502. The video camera 520 may be configured to capture images at various resolutions or at different frame rates. Video cameras with a small form-factor, such as those used in cell phones or webcams, for example, may be incorporated into an example embodiment of the system 500.

Further, although FIG. 5A illustrates one video camera 520, more video cameras may be used, and each may be configured to capture the same view, or to capture different views. For example, the video camera 520 may be forward facing to capture at least a portion of the real-world view perceived by the user. This forward facing image captured by the video camera 520 may then be used to generate an augmented reality where computer generated images appear to interact with the real-world view perceived by the user.

The sensor 522 is shown on the extending side-arm 516 of the head-mounted device 502; however, the sensor 522 may be positioned on other parts of the head-mounted device 502. The sensor 522 may include one or more of a gyroscope or an accelerometer, for example. Other sensing devices may be included within, or in addition to, the sensor 522 or other sensing functions may be performed by the sensor 522.

The finger-operable touch pad 524 is shown on the extending side-arm 514 of the head-mounted device 502. However, the finger-operable touch pad 524 may be positioned on other parts of the head-mounted device 502. Also, more than one finger-operable touch pad may be present on the head-mounted device 502. The finger-operable touch pad 524 may be used by a user to input commands. The finger-operable touch pad 524 may sense at least one of a position and a movement of a finger via capacitive sensing, resistance sensing, or a surface acoustic wave process, among other possibilities. The finger-operable touch pad 524 may be capable of sensing finger movement in a direction parallel or planar to the pad surface, in a direction normal to the pad surface, or both, and may also be capable of sensing a level of pressure applied to the pad surface. The finger-operable touch pad 524 may be formed of one or more translucent or transparent insulating layers and one or more translucent or transparent conducting layers. Edges of the finger-operable touch pad 524 may be formed to have a raised, indented, or roughened surface, so as to provide tactile feedback to a user when the user's finger reaches the edge, or other area, of the finger-operable touch pad 524. If more than one finger-operable touch pad is present, each finger-operable touch pad may be operated independently, and may provide a different function.

Figure 5B:
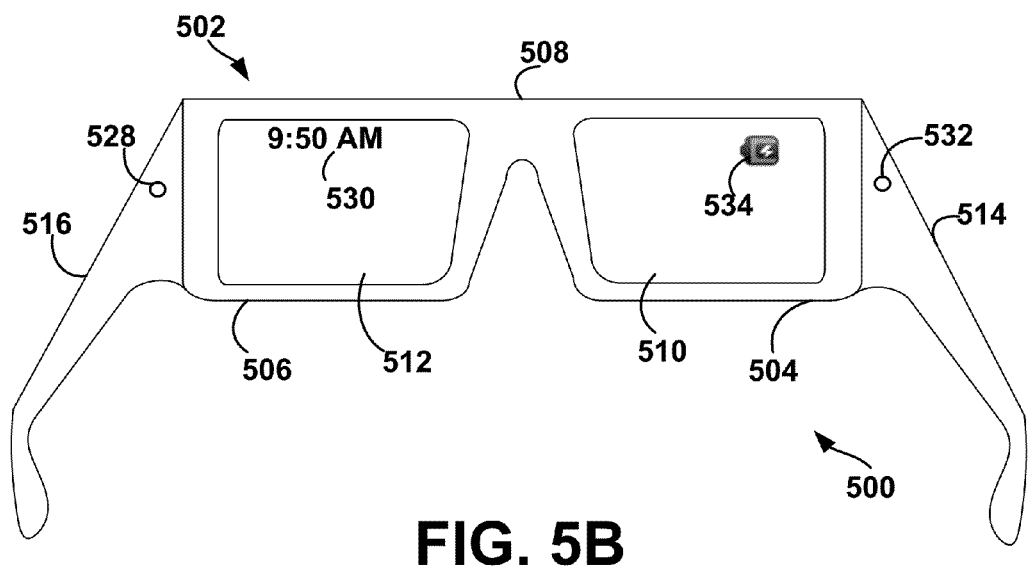
FIG. 5B is a diagram illustrating an alternate view of the system illustrated in FIG. 5A, according to an exemplary embodiment.

FIG. 5B is a diagram illustrating an alternate view of the system illustrated in FIG. 5A, according to an exemplary embodiment. As shown in FIG. 5B, the lens elements 510, 512 may act as display elements. The head-mounted device 502 may include a first projector 528 coupled to an inside surface of the extending side-arm 516 and configured to project a display 530 onto an inside surface of the lens element 512. Additionally or alternatively, a second projector 532 may be coupled to an inside surface of the extending side-arm 514 and configured to project a display 534 onto an inside surface of the lens element 510.

The lens elements 510, 512 may act as a combiner in a light projection system and may include a coating that reflects the light projected onto them from the projectors 528, 532. In some embodiments, a reflective coating may be omitted (e.g., when the projectors 528, 532 are scanning laser devices).

In alternative embodiments, other types of display elements may also be used. For example, the lens elements 510, 512 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 504, 506 for driving such a matrix display. Alternatively or additionally, a laser or light emitting diode (LED) source and scanning system could be used to draw a raster display directly onto the retina of one or more of the user's eyes. Other possibilities exist as well.

Figure 6A:
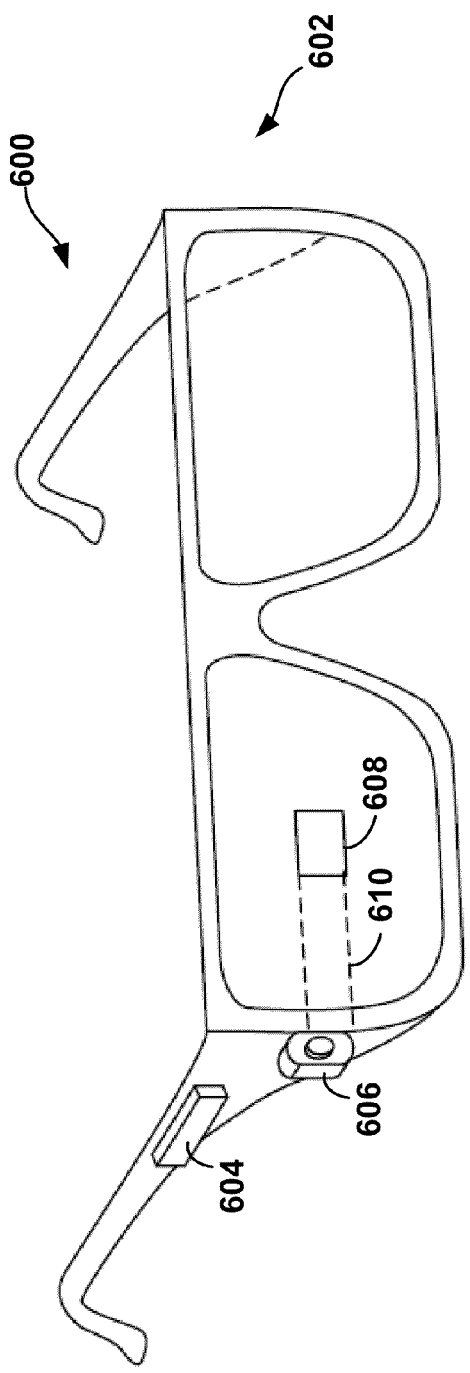
FIG. 6A is a diagram illustrating a second example system for receiving, transmitting, and displaying data, according to an exemplary embodiment.

FIG. 6A is a diagram illustrating a second example system for receiving, transmitting, and displaying data, according to an exemplary embodiment. The system 600 is shown in the form of a wearable computing device 602. The wearable computing device 602 may include frame elements and side-arms such as those described with respect to FIGS. 5A and 5B. The wearable computing device 602 may additionally include an on-board computing system 604 and a video camera 606, such as those described with respect to FIGS. 5A and 5B. The video camera 606 is shown mounted on a frame of the wearable computing device 602; however, the video camera 606 may be mounted at other positions as well.

As shown in FIG. 6A, the wearable computing device 602 may include a single display 608 which may be coupled to the device. The display 608 may be formed on one of the lens elements of the wearable computing device 602, such as a lens element described with respect to FIGS. 5A and 5B, and may be configured to overlay computer-generated graphics in the user's view of the physical world. The display 608 is shown to be provided in a center of a lens of the wearable computing device 602, however, the display 608 may be provided in other positions. The display 608 is controllable via the computing system 604 that is coupled to the display 608 via an optical waveguide 610.

Figure 6B:
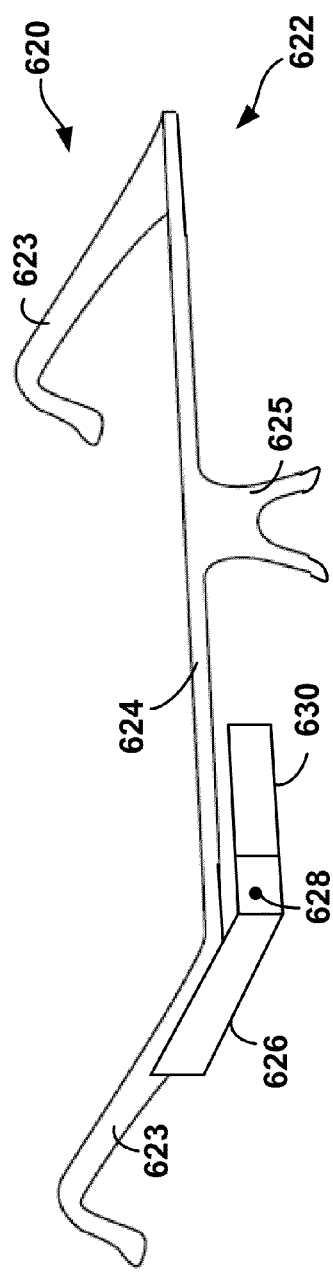
FIG. 6B is a diagram illustrating a third example system for receiving, transmitting, and displaying data, according to an exemplary embodiment.

FIG. 6B is a diagram illustrating a third example system for receiving, transmitting, and displaying data, according to an exemplary embodiment. The system 620 is shown in the form of a wearable computing device 622. The wearable computing device 622 may include side-arms 623, a center frame support 624, and a bridge portion with nosepiece 625. In the example shown in FIG. 6B, the center frame support 624 connects the side-arms 623. The wearable computing device 622 does not include lens-frames containing lens elements. The wearable computing device 622 may additionally include an on-board computing system 626 and a video camera 628, such as those described with respect to FIGS. 5A and 5B.

The wearable computing device 622 may include a single lens element 630 that may be coupled to one of the side-arms 623 or the center frame support 624. The lens element 630 may include a display such as the display described with reference to FIGS. 5A and 5B, and may be configured to overlay computer-generated graphics upon the user's view of the physical world. In one example, the single lens element 630 may be coupled to a side of the extending side-arm 623. The single lens element 630 may be positioned in front of or proximate to a user's eye when the wearable computing device 622 is worn by a user. For example, the single lens element 630 may be positioned below the center frame support 624, as shown in FIG. 6B.

Figure 7:
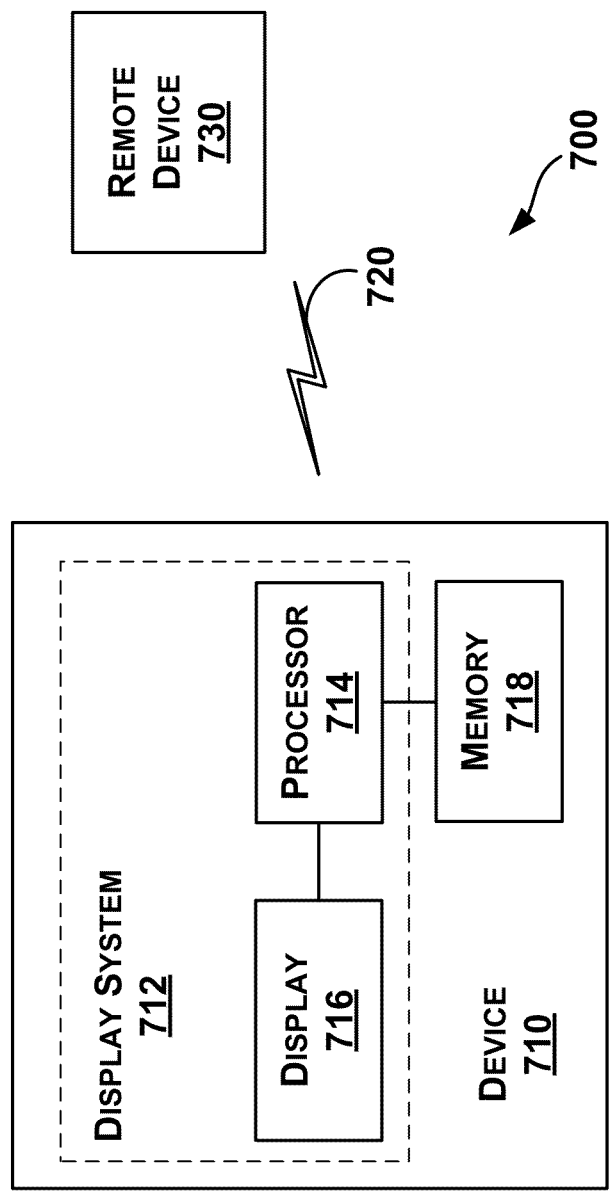
FIG. 7 is a simplified block diagram illustrating an example computer network infrastructure, according to an exemplary embodiment.

FIG. 7 is a simplified block diagram illustrating an example computer network infrastructure, according to an exemplary embodiment. In system 700, a device 710 communicates using a communication link 720 (e.g., a wired or wireless connection) to a remote device 730. The device 710 may be any type of device that can receive data and display information corresponding to or associated with the data. For example, the device 710 may be a heads-up display system, such as the head-mounted device 502, 600, or 620 described with reference to FIGS. 5A-6B.

Thus, the device 710 may include a display system 712 comprising a processor 714 and a display 716. The display 716 may be, for example, an optical see-through display, an optical see-around display, or a video see-through display. The processor 714 may receive data from the remote device 730, and configure the data for display on the display 716. The processor 714 may be any type of processor, such as a microprocessor or a digital signal processor, for example.

The device 710 may further include on-board data storage, such as memory 718 coupled to the processor 714. The memory 718 may store software that can be accessed and executed by the processor 714, for example.

The remote device 730 may be any type of computing device or transmitter including a laptop computer, a mobile telephone, or tablet computing device, etc., that is configured to transmit data to the device 710. The remote device 730 and the device 710 may contain hardware to enable the communication link 720, such as processors, transmitters, receivers, antennas, etc.

In FIG. 7, the communication link 720 is illustrated as a wireless connection; however, wired connections may also be used. For example, the communication link 720 may be a wired serial bus such as a universal serial bus or a parallel bus, among other connections. The communication link 720 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), and/or Zigbee, among other possibilities. Either of such a wired and/or wireless connection may be a proprietary connection as well. The remote device 730 may be accessible via the Internet and may include a computing cluster associated with a particular web service (e.g., social-networking, photo sharing, address book, etc.).

Figure 8:
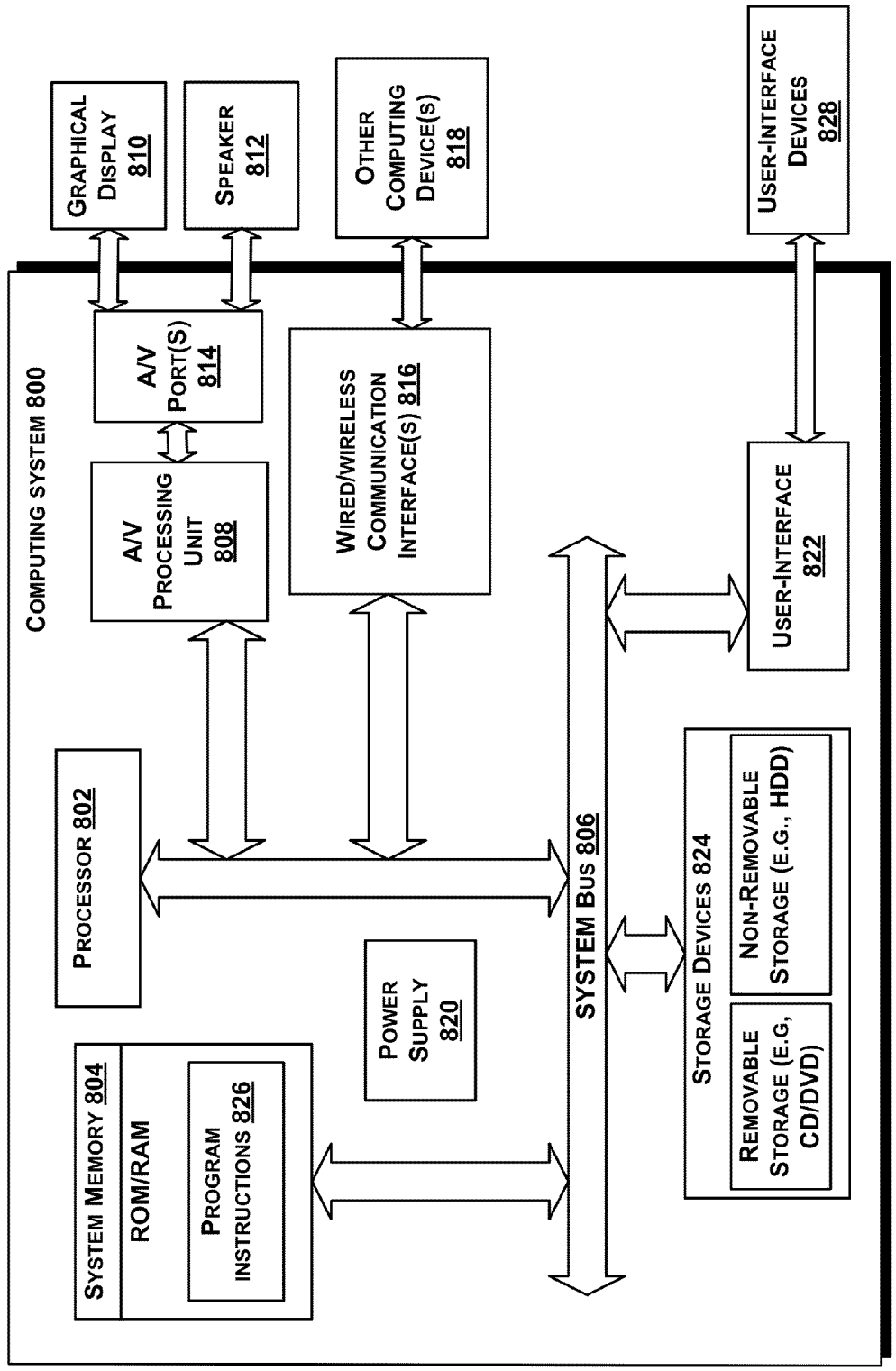
FIG. 8 is a simplified block diagram illustrating example components of an example computing system, according to an exemplary embodiment.

As described above in connection with FIGS. 5A-6B, an example wearable computing device may include, or may otherwise be communicatively coupled to, a computing system, such as computing system 518 or computing system 604. FIG. 8 is a simplified block diagram illustrating example components of an example computing system, according to an exemplary embodiment. One or both of the device 710 and the remote device 730 may take the form of computing system 800.

Computing system 800 may include at least one processor 802 and system memory 804. In an example embodiment, computing system 800 may include a system bus 806 that communicatively connects processor 802 and system memory 804, as well as other components of computing system 800. Depending on the desired configuration, processor 802 can be any type of processor including, but not limited to, a microprocessor (µP), a microcontroller (µC), a digital signal processor (DSP), or any combination thereof. Furthermore, system memory 804 can be of any type of memory now known or later developed including but not limited to volatile memory (such as RAM), non-volatile memory (such as ROM, flash memory, etc.) or any combination thereof.

An example computing system 800 may include various other components as well. For example, computing system 800 includes an A/V processing unit 808 for controlling graphical display 810 and speaker 812 (via A/V port 814), one or more communication interfaces 816 for connecting to other computing devices 818, and a power supply 820. Graphical display 810 may be arranged to provide a visual depiction of various input regions provided by user-interface module 822. For example, user-interface module 822 may be configured to provide a user-interface, such as the example user-interface described below in connection with other FIGS. 9A-D below and graphical display 810 may be configured to provide a visual depiction of the user-interface.

Figure 9A:
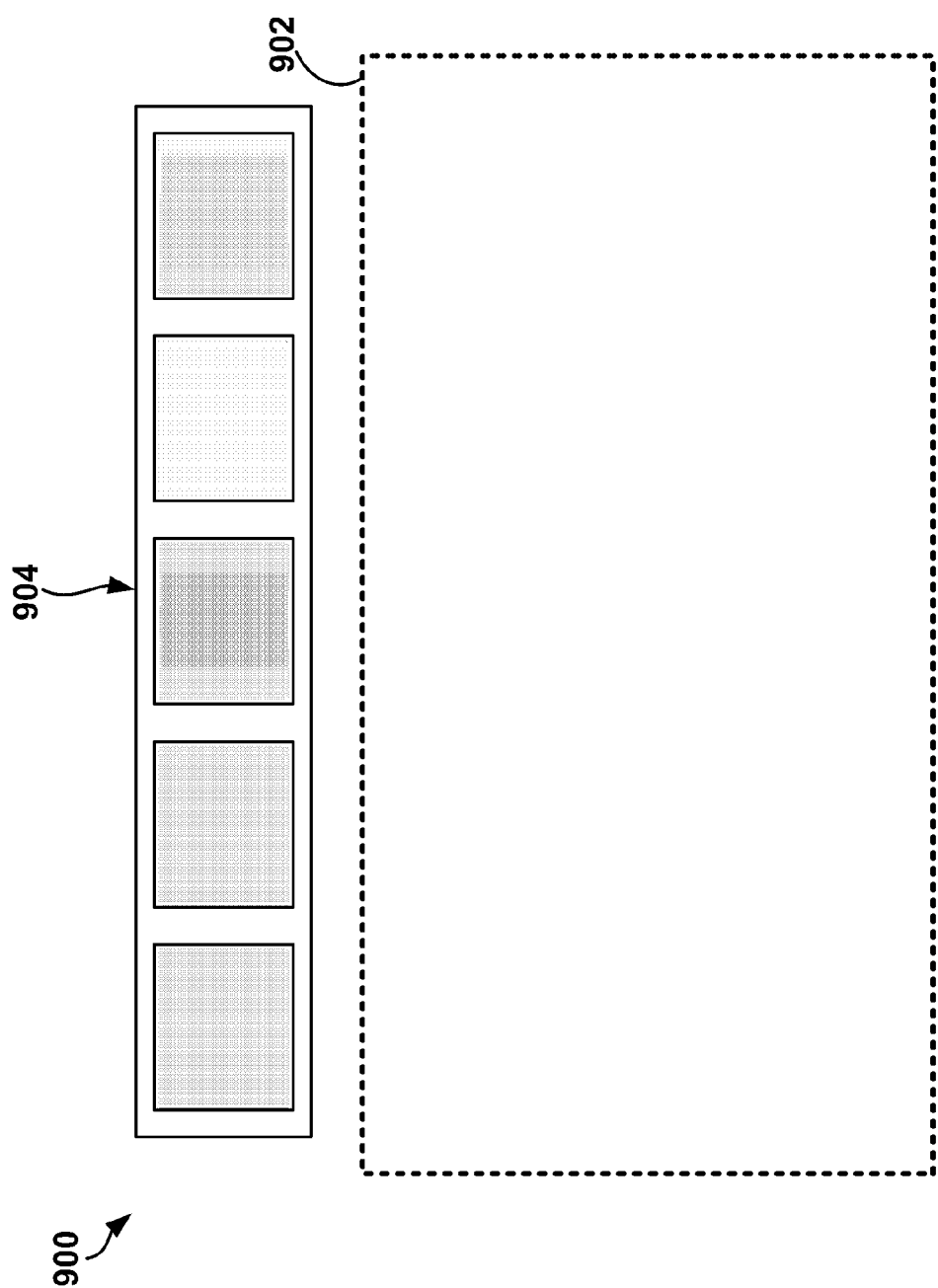
FIG. 9A is a diagram illustrating aspects of an example user-interface, according to an exemplary embodiment.
Figure 9B:
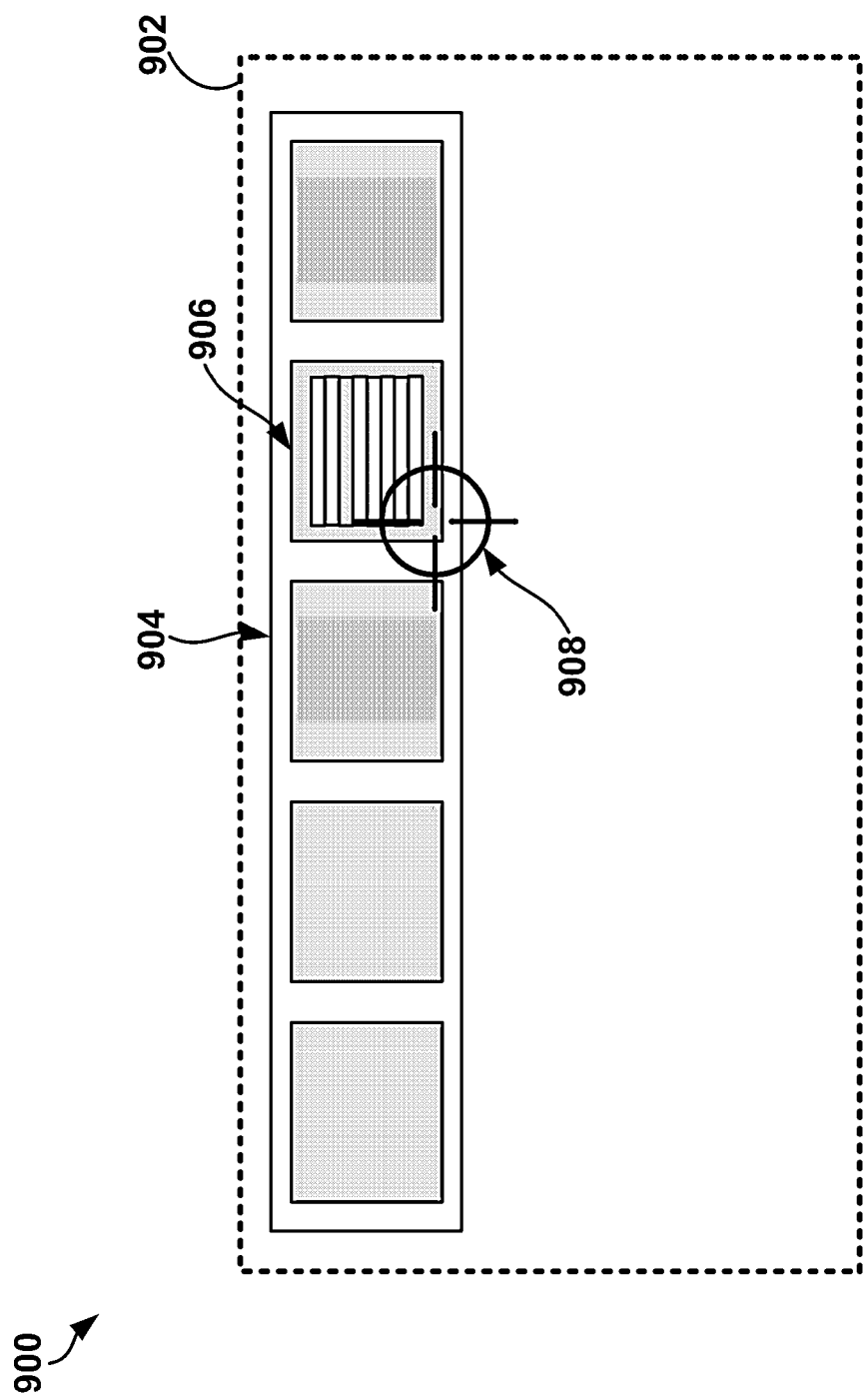
FIG. 9B is a diagram illustrating aspects of an example user-interface after receiving movement data corresponding to an upward movement, according to an exemplary embodiment.
Figure 9D:
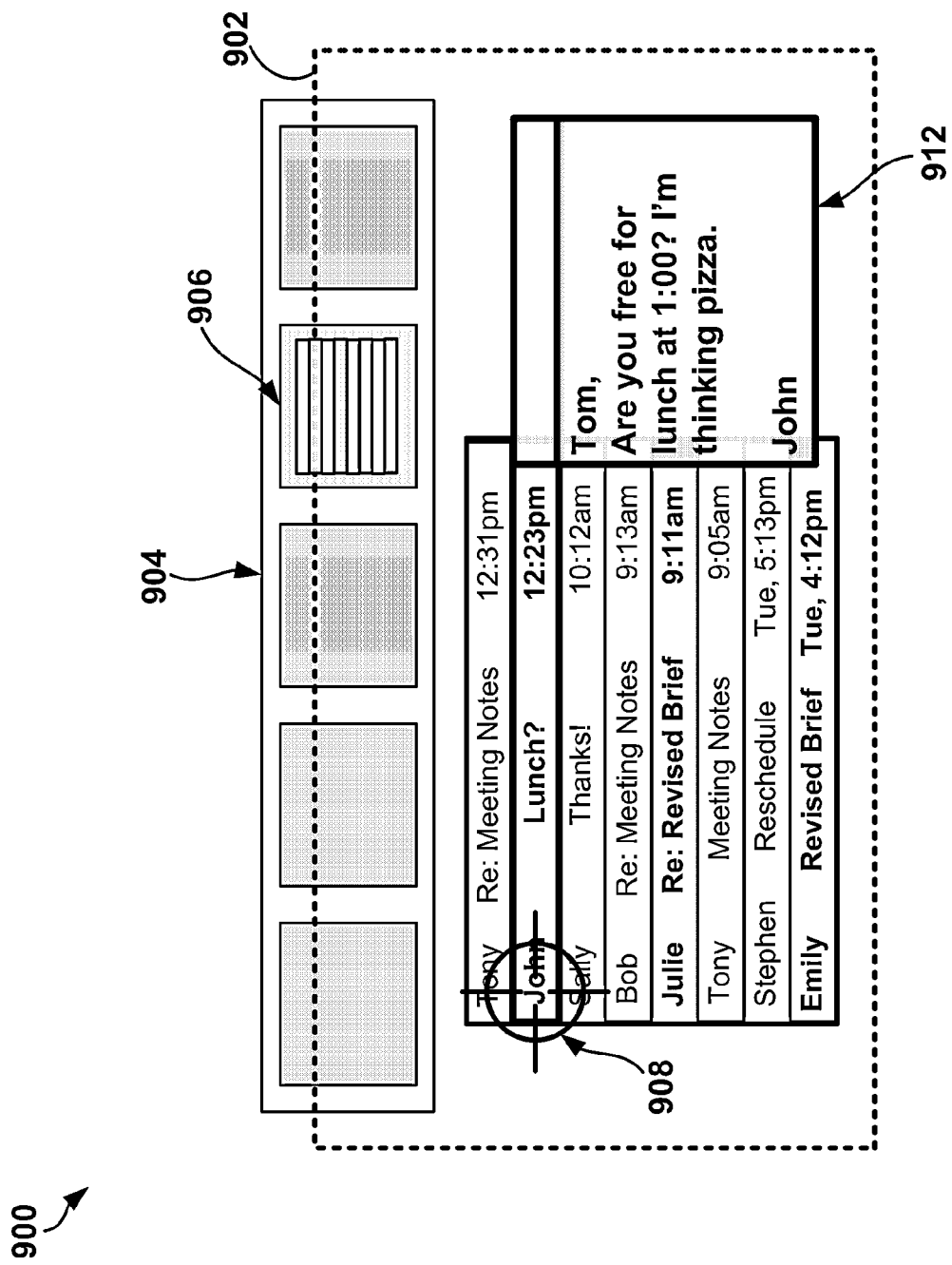
FIG. 9D is a diagram illustrating aspects of an example user-interface after receiving input data corresponding to a user input, according to an exemplary embodiment.

FIG. 9A is a diagram illustrating aspects of an example user-interface, according to an exemplary embodiment. FIG. 9B is a diagram illustrating aspects of an example user-interface after receiving movement data corresponding to an upward movement, according to an exemplary embodiment. FIG. 9C is a diagram illustrating aspects of an example user-interface after selection of a selected content object, according to an exemplary embodiment. FIG. 9D is a diagram illustrating aspects of an example user-interface after receiving input data corresponding to a user input, according to an exemplary embodiment.

User-interface module 822 may be further configured to receive data from and transmit data to (or be otherwise compatible with) one or more user-interface devices 828.

Furthermore, computing system 800 may also include one or more data storage devices 824, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), and/or any other storage device now known or later developed. Computer storage media can include volatile and nonvolatile, removable and non-removable media implemented in any method or technology for storage of information, such as computer readable instructions, data structures, program modules, or other data. For example, computer storage media may take the form of RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium now known or later developed that can be used to store the desired information and which can be accessed by computing system 800.

According to an example embodiment, computing system 800 may include program instructions 826 that are stored in system memory 804 (and/or possibly in another data-storage medium) and executable by processor 802 to facilitate the various functions described herein including, but not limited to, those functions described with respect to FIG. 1. Although various components of computing system 800 are shown as distributed components, it should be understood that any of such components may be physically integrated and/or distributed according to the desired configuration of the computing system.

E. Example User-Interface

FIGS. 9A-D show aspects of an example user-interface 900. The user-interface 900 may be displayed by, for example, a wearable computing device as described above for FIGS. 5A-6B.

An example state of the user-interface 900 is shown in FIG. 9A. The example state shown in FIG. 9A may correspond to a first position of the wearable computing device. That is, the user-interface 900 may be displayed as shown in FIG. 9A when the wearable computing device is in the first position. In some embodiments, the first position of the wearable computing device may correspond to a position of the wearable computing device when a wearer of the wearable computing device is looking in a direction that is generally parallel to the ground (e.g., a position that does not correspond to the wearer looking up or looking down). Other examples are possible as well.

As shown, the user-interface 900 includes a view region 902. An example boundary of the view region 902 is shown by a dotted frame. While the view region 902 is shown to have a landscape shape (in which the view region 902 is wider than it is tall), in other embodiments the view region 902 may have a portrait or square shape, or may have a non-rectangular shape, such as a circular or elliptical shape. The view region 902 may have other shapes as well.

The view region 902 may be, for example, the viewable area between (or encompassing) the upper, lower, left, and right boundaries of a display on the wearable computing device. As shown, when the wearable computing device is in the first position, the view region 902 is substantially empty (e.g., completely empty) of user-interface elements, such that the user's view of their real-world environment is generally uncluttered, and objects in the user's environment are not obscured.

In some embodiments, the view region 902 may correspond to a field of view of a wearer of the wearable computing device, and an area outside the view region 902 may correspond to an area outside the field of view of the wearer. In other embodiments, the view region 902 may correspond to a non-diagonal portion of a field of view of a wearer of the wearable computing device, and an area outside the view region 902 may correspond to a diagonal portion of the field of view of the wearer. In still other embodiments, the user-interface 900 may be larger than or substantially the same as a field of view of a wearer of the wearable computing device, and the field of view of the wearer may be larger than or substantially the same size as the view region 902. The view region 902 may take other forms as well.

Accordingly, the portions of the user-interface 900 outside of the view region 902 may be outside of or in a diagonal portion of a field of view of a wearer of the wearable computing device. For example, as shown, a menu 904 may be outside of or in a diagonal portion of the field of view of the user in the user-interface 900. While the menu 904 is shown to be not visible in the view region 902, in some embodiments the menu 904 may be partially visible in the view region 902.

In some embodiments, the wearable computing device may be configured to receive movement data corresponding to, for example, an upward movement of the wearable computing device to a position above the first position. In these embodiments, the wearable computing device may, in response to receiving the movement data corresponding to the upward movement, cause one or both of the view region 902 and the menu 904 to move such that the menu 904 becomes more visible in the view region 902. For example, the wearable computing device may cause the view region 902 to move upward and may cause the menu 904 to move downward. The view region 902 and the menu 904 may move the same amount, or may move different amounts. In one embodiment, the menu 904 may move further than the view region 902. As another example, the wearable computing device may cause only the menu 904 to move. Other examples are possible as well.

While the term "upward" is used, it is to be understood that the upward movement may encompass any movement having any combination of moving, tilting, rotating, shifting, sliding, or other movement that results in a generally upward movement. Further, in some embodiments "upward" may refer to an upward movement in the reference frame of a wearer of the wearable computing device. Other reference frames are possible as well. In embodiments where the wearable computing device is a head-mounted device, the upward movement of the wearable computing device may also be an upward movement of a wearer's head such as, for example, the user looking upward.

The movement data corresponding to the upward movement may take several forms. For example, the movement data may be (or may be derived from) data received from one or more movement sensors, accelerometers, and/or gyroscopes configured to detect the upward movement, such as the sensor 922 described above in connection with FIG. 9A. In some embodiments, the movement data may comprise a binary indication corresponding to the upward movement. In other embodiments, the movement data may comprise an indication corresponding to the upward movement as well as an extent of the upward movement. The movement data may take other forms as well.

FIG. 9B shows aspects of an example user-interface after receiving movement data corresponding to an upward movement. As shown, the user-interface 900 includes the view region 902 and the menu 904.

As noted above, in response to receiving the movement data corresponding to an upward movement of the wearable computing device, the wearable computing device may move one or both of the view region 902 and the menu 904 such that the menu 904 becomes more visible in the view region 902.

As shown, the menu 904 is fully visible in the view region 902. In other embodiments, however, only a portion of the menu 904 may be visible in the view region 902. In some embodiments, the extent to which the menu 904 is visible in the view region 902 may be based at least in part on an extent of the upward movement.

Thus, the view region 902 may be moved in response to receiving data corresponding to an upward movement. In some embodiments, the view region 902 may be moved in an upward scrolling or panning motion. For instance, the view region 902 may appear to a wearer of the wearable computing device as if mapped onto the inside of a static sphere centered at the wearable computing device, and movement of the view region 902 may map onto movement of the real-world environment relative to the wearable computing device. A speed, acceleration, and/or magnitude of the upward scrolling may be based at least in part on a speed, acceleration, and/or magnitude of the upward movement. In other embodiments, the view region 902 may be moved by, for example, jumping between fields of view. In still other embodiments, the view region 902 may be moved only when the upward movement exceeds a threshold speed, acceleration, and/or magnitude. In response to receiving data corresponding to an upward movement that exceeds such a threshold or thresholds, the view region 902 may pan, scroll, slide, or jump to a new field of view. The view region 902 may be moved in other manners as well.

While the foregoing description focused on upward movement, it is to be understood that the wearable computing device could be configured to receive data corresponding to other directional movement (e.g., downward, leftward, rightward, etc.) as well, and that the view region 902 may be moved in response to receiving such data in a manner similar to that described above in connection with upward movement.

As shown, the menu 904 includes a number of content objects 906. In some embodiments, the content objects 906 may be arranged in a ring (or partial ring) around and above the head of a wearer of the wearable computing device. In other embodiments, the content objects 906 may be arranged in a dome-shape above the wearer's head. The ring or dome may be centered above the wearable computing device and/or the wearer's head. In other embodiments, the content objects 906 may be arranged in other ways as well.

The number of content objects 906 in the menu 904 may be fixed or may be variable. In embodiments where the number is variable, the content objects 906 may vary in size according to the number of content objects 906 in the menu 904. In embodiments where the content objects 906 extend circularly around a wearer's head, like a ring (or partial ring), only some of the content objects 906 may be visible at a particular moment. In order to view other content objects 904, a wearer of the wearable computing device may interact with the wearable computing device to, for example, rotate the content objects 906 along a path (e.g., clockwise or counterclockwise) around the wearer's head. To this end, the wearable computing device may be configured to receive data indicating such an interaction through, for example, a touch pad, such as finger-operable touch pad 924. Alternatively or additionally, the wearable computing device may be configured to receive such data through other input devices as well.

Depending on the application of the wearable computing device, the content objects 906 may take several forms. For example, the content objects 906 may include one or more of people, contacts, groups of people and/or contacts, calendar items, lists, notifications, alarms, reminders, status updates, incoming messages, recorded media, audio recordings, video recordings, photographs, digital collages, previously-saved states, webpages, and applications, as well as tools, such as a still camera, a video camera, and an audio recorder. Content objects 906 may take other forms as well.

In embodiments where the content objects 906 include tools, the tools may be located in a particular region of the menu 904, such as the center. In some embodiments, the tools may remain in the center of the menu 904, even if the other content objects 906 rotate, as described above. Tool content objects may be located in other regions of the menu 904 as well.

The particular content objects 906 that are included in menu 904 may be fixed or variable. For example, the content objects 906 may be preselected by a wearer of the wearable computing device. In another embodiment, the content objects 906 for each content region may be automatically assembled by the wearable computing device from one or more physical or digital contexts including, for example, people, places, and/or objects surrounding the wearable computing device, address books, calendars, social-networking web services or applications, photo sharing web services or applications, search histories, and/or other contexts. Further, some content objects 906 may fixed, while the content objects 906 may be variable. The content objects 906 may be selected in other manners as well.

Similarly, an order or configuration in which the content objects 906 are displayed may be fixed or variable. In one embodiment, the content objects 906 may be pre-ordered by a wearer of the wearable computing device. In another embodiment, the content objects 906 may be automatically ordered based on, for example, how often each content object 906 is used (on the wearable computing device only or in other contexts as well), how recently each content object 906 was used (on the wearable computing device only or in other contexts as well), an explicit or implicit importance or priority ranking of the content objects 906, and/or other criteria.

In some embodiments, the wearable computing device may be further configured to receive from the wearer a selection of a content object 906 from the menu 904. To this end, the user-interface 900 may include a cursor 908, shown in FIG. 9B as a reticle, which may be used to navigate to and select content objects 906 from the menu 904. In some embodiments, the cursor 908 may be controlled by a wearer of the wearable computing device through one or more predetermined movements. Accordingly, the wearable computing device may be further configured to receive selection data corresponding to the one or more predetermined movements.

The selection data may take several forms. For example, the selection data may be (or may be derived from) data received from one or more movement sensors, accelerometers, gyroscopes, and/or detectors configured to detect the one or more predetermined movements. The one or more movement sensors may be included in the wearable computing device, like the sensor 922, or may be included in a diagonal device communicatively coupled to the wearable computing device. As another example, the selection data may be (or may be derived from) data received from a touch pad, such as the finger-operable touch pad 924 described above in connection with FIG. 9A, or other input device included in or coupled to the wearable computing device and configured to detect one or more predetermined movements. In some embodiments, the selection data may take the form of a binary indication corresponding to the predetermined movement. In other embodiments, the selection data may indicate the extent, the direction, the velocity, and/or the acceleration associated with the predetermined movement. The selection data may take other forms as well.

The predetermined movements may take several forms. In some embodiments, the predetermined movements may be certain movements or sequence of movements of the wearable computing device or diagonal device. In some embodiments, the predetermined movements may include one or more predetermined movements defined as no or substantially no movement, such as no or substantially no movement for a predetermined period of time. In embodiments where the wearable computing device is a head-mounted device, one or more predetermined movements may involve a predetermined movement of the wearer's head (which is assumed to move the wearable computing device in a corresponding manner). Alternatively or additionally, the predetermined movements may involve a predetermined movement of a diagonal device communicatively coupled to the wearable computing device. The diagonal device may similarly be wearable by a wearer of the wearable computing device, such that the movement of the diagonal device may follow a movement of the wearer, such as, for example, a movement of the wearer's hand. Still alternatively or additionally, one or more predetermined movements may be, for example, a movement across a finger-operable touch pad or other input device. Other predetermined movements are possible as well.

As shown, a wearer of the wearable computing device has navigated the cursor 908 to the content object 906 using one or more predetermined movements. In order to select the content object 906, the wearer may perform an additional predetermined movement, such as holding the cursor 908 over the content object 906 for a predetermined period of time. The wearer may select the content object 906 in other manners as well.

Once a content object 906 is selected, the wearable computing device may cause the content object 906 to be displayed in the view region 902 as a selected content object. FIG. 9C shows aspects of an example user-interface after selection of a selected content object, in accordance with an embodiment.

As indicated by the dotted arrow, the content object 906 is displayed in the view region 902 as a selected content object 910. As shown, the selected content object 910 is displayed larger and in more detail in the view region 902 than in the menu 904. In other embodiments, however, the selected content object 910 could be displayed in the view region 902 smaller than or the same size as, and in less detail than or the same detail as, the menu 904. In some embodiments, additional content (e.g., actions to be applied to, with, or based on the selected content object 910, information related to the selected content object 910, and/or modifiable options, preferences, or parameters for the selected content object 910, etc.) may be showed adjacent to or nearby the selected content object 910 in the view region 902.

Once the selected content object 910 is displayed in the view region 902, a wearer of the wearable computing device may interact with the selected content object 910. For example, as the selected content object 910 is shown as an email inbox, the wearer may wish to read one of the emails in the email inbox. Depending on the selected content object, the wearer may interact with the selected content object in other ways as well (e.g., the wearer may locate additional information related to the selected content object 910, modify, augment, and/or delete the selected content object 910, etc.). To this end, the wearable computing device may be further configured to receive input data corresponding to one or more predetermined movements indicating interactions with the user-interface 900. The input data may take any of the forms described above in connection with the selection data.

FIG. 9D shows aspects of an example user-interface after receiving input data corresponding to a user input, in accordance with an embodiment. As shown, a wearer of the wearable computing device has navigated the cursor 908 to a particular subject line in the email inbox and selected the subject line. As a result, the email 912 is displayed in the view region, so that the wearer may read the email 912. The wearer may interact with the user-interface 900 in other manners as well, depending on, for example, the selected content object.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

I claim:

1. A system comprising:
    a non-transitory computer-readable medium; and
    program instructions stored on the non-transitory computer-readable medium and executable by at least one processor to:
        display a pointer in a graphic display, wherein at least one graphic object is also displayed in the graphic display;
        receive body-movement data that is indicative of body movement;
        use the body-movement data as a basis to move the pointer in the graphic display;
        define an active region in an area of the graphic display that corresponds to the graphic object, wherein a boundary of the active region is defined by an outline of the graphic object;
        define an expanded active region in an area of the graphic display that encompasses and is larger than the area of the graphic display occupied by the graphic object; and
        make the graphic object active in response to the pointer being moved into the active region and then keep the graphic object active until the pointer is moved outside of the expanded active region.

2. The system of claim 1, wherein the system comprises a wearable computer having a head-mounted display (HMD), the system further comprises the program instructions stored on the non-transitory computer-readable medium and further executable by at least one processor to, while the graphic object is active, receive input data that indicates to initiate an action that corresponds to the graphic object.

3. The system of claim 2, wherein the action comprises selection of the graphic object.

4. The system of claim 1, wherein a speed parameter maps a given amount of body movement to a first amount of selection-icon movement, and wherein the system further comprises program instructions stored on the non-transitory computer-readable medium and executable by at least one processor to adjust the speed parameter so as to map a second amount of selection-icon movement to the given amount of body movement, wherein the second amount differs from the first amount.

5. The system of claim 1, further comprising program instructions stored on the non-transitory computer-readable medium and executable by at least one processor to:
    determine a velocity corresponding to the body movement; and
    while the graphic object is active, prevent the pointer from moving outside of the expanded active region unless the determined velocity is less than a predetermined exit velocity.

6. The system of claim 1, wherein the program instructions stored on the non-transitory computer-readable medium and executable by at least one processor to make the graphic object active in response to the pointer being moved into the active region comprises program instructions stored on the non-transitory computer-readable medium and executable by at least one processor to:
    determine that the pointer is within the active region for at least a predetermined period of time; and
    responsively initiate an action that is associated with the graphic object.

7. The system of claim 1, wherein the program instructions stored on the non-transitory computer-readable medium and executable by at least one processor to make the graphic object active in response to the pointer being moved into the active region comprises program instructions stored on the non-transitory computer-readable medium and executable by at least one processor to:
    determine that the pointer is moving at a rate of movement that is less than a predetermined rate of movement; and
    responsive to the rate of movement falling below the rate of movement, initiate an action that corresponds to the graphic object.

8. The system of claim 1, further comprising program instructions stored on the non-transitory computer-readable medium and executable by at least one processor to, in response to the graphic object being made active, provide a visual representation of the expanded active region on the graphic display.

9. A computer-implemented method comprising:
    displaying a pointer and at least one graphic object in a graphic display of a head-mounted display (HMD), wherein movement of the pointer in the graphic display is based on a body-movement data;
    determining that the pointer is located within an active region, wherein the active region comprises an area of the graphic display that corresponds to a graphic object, and wherein a boundary of the active region is defined by an outline of the graphic object; and
    in response to determining that the pointer is located within the active region:
        making the graphic object active; and
        keeping the graphic object active so long as the pointer is within an expanded active region, wherein the expanded active region comprises an area of the graphic display that encompasses and is larger than the area of the graphic display occupied by the graphic object.

10. The method of claim 9, wherein the body movement comprises eye movement.

11. The method of claim 9, further comprising, after making the graphic object active:
    determining that the pointer is outside the expanded active region; and
    responsively deactivating the graphic object.

12. The method of claim 9, wherein a speed parameter maps a given amount of body movement to a first amount of selection-icon movement, the method further comprising:
    after making the graphic object active, adjusting the speed parameter so as to map a second amount of selection-icon movement to the given amount of body movement, wherein the second amount differs from the first amount.

13. The method of claim 9, wherein the method further comprises, after making the graphic object active, requiring that an acceleration of the pointer exceed a predetermined exit acceleration in order to move the pointer out of the expanded active region.

14. The method of claim 9, further comprising:
    determining that the pointer has been active for at least a threshold period of time; and
    responsively initiating an action that corresponds to the graphic object.

15. The method of claim 9, further comprising:
    while the graphic object is active, receiving input data corresponding to an action that is associated with the graphic object; and
    responsive to receiving the input data while the graphic object is active, initiating the action.

16. A non-transitory computer readable medium having stored therein instructions executable by a computing device to cause the computing device to perform functions comprising:
    displaying a pointer and at least one graphic object in a graphic display of a head-mounted display (HMD), wherein movement of the pointer in the graphic display is based on a body-movement data;
    determining that the pointer is located within an active region, wherein the active region comprises an area of the graphic display that corresponds to the graphic object, wherein a boundary of the active region is defined by an outline of the graphic object; and
    in response to determining that the pointer is located within the active region:
        making the graphic object active; and
        keeping the graphic object active so long as the pointer is within an expanded active region, wherein the expanded active region comprises an area of the graphic display that encompasses and is larger than the area of the graphic display occupied by the graphic object.

17. The non-transitory computer readable medium of claim 16, wherein the functions further comprise:
    after making the graphic object active, determining that the pointer is outside the expanded active region; and
    responsively deactivating the graphic object.

18. The non-transitory computer readable medium of claim 16, wherein a speed parameter maps a given amount of body movement to a first amount of selection-icon movement, and wherein the functions further comprise:
    after making the graphic object active, adjusting the speed parameter so as to map a second amount of selection-icon movement to the given amount of body movement, wherein the second amount differs from the first amount.

19. The non-transitory computer readable medium of claim 16, wherein the functions further comprise:
    after making the graphic object active, requiring that an acceleration of the pointer exceed a predetermined exit acceleration in order to move the pointer out of the expanded active region.

20. The non-transitory computer readable medium of claim 16, wherein the functions further comprise:
    determining that the graphic object has been active for at least a threshold period of time; and
    responsively initiating an action that corresponds to the graphic object.

21. The non-transitory computer readable medium of claim 17, wherein the functions further comprise:
    while the graphic object is active, receiving input data corresponding to an action that is associated with the graphic object; and
    responsive to receiving the input data while the graphic object is active, initiating the action.

\* \* \* \* \*